(12) United States Patent
Amend

(10) Patent No.: US 9,695,590 B2
(45) Date of Patent: *Jul. 4, 2017

(54) SUBFLOOR COMPONENT AND METHOD FOR MANUFACTURING SAME

(71) Applicant: Victor Amend, Toronto (CA)

(72) Inventor: Victor Amend, Toronto (CA)

( * ) Notice: Subject to any disclaimer, the term of this patent is extended or adjusted under 35 U.S.C. 154(b) by 423 days.

This patent is subject to a terminal disclaimer.

(21) Appl. No.: 14/268,060

(22) Filed: May 2, 2014

(65) Prior Publication Data

US 2015/0315801 A1    Nov. 5, 2015

Related U.S. Application Data

(63) Continuation-in-part of application No. 13/489,712, filed on Jun. 6, 2012, now abandoned, which is a
(Continued)

(51) Int. Cl.
*E04C 1/00* (2006.01)
*E04C 2/26* (2006.01)
(Continued)

(52) U.S. Cl.
CPC ............ *E04C 2/26* (2013.01); *B29C 44/02* (2013.01); *B29C 44/3415* (2013.01); *B29C 44/445* (2013.01); *B29C 65/02* (2013.01); *E04B 1/70* (2013.01); *E04B 5/48* (2013.01); *E04F 15/02038* (2013.01); *E04F 15/02194* (2013.01); *E04F 15/06* (2013.01); *E04F 15/082* (2013.01); *E04F 15/102* (2013.01); *E04F 15/105* (2013.01); *E04F 15/107* (2013.01); *E04F 15/185* (2013.01); *B29K 2025/06* (2013.01); *B29K 2105/048* (2013.01); *B29K 2995/0069* (2013.01); *B29L 2007/002* (2013.01);
(Continued)

(58) Field of Classification Search
CPC ......... E04C 2/284; E04C 2/288; E04C 2/292; B29C 65/02; B29C 44/445; B29C 44/14; E04B 1/70; E04F 15/02038; E04F 15/107; E04F 15/02161; B32B 15/046
USPC ............... 52/408, 409, 302.3, 309.4, 309.14, 52/745.19, 309.8, 309.9, 302.1, 403.1, 52/413, 169.5, 385, 386; 428/158, 167, 428/172
See application file for complete search history.

(56) References Cited

U.S. PATENT DOCUMENTS 4,623,584 A     11/1986   Masui et al.
5,121,166 A *   6/1992    Miyamoto ........... G03G 15/168
                                              15/256.5
(Continued)

FOREIGN PATENT DOCUMENTS

DE          3443705 A1    6/1986
DE         19619892 A1    6/1997
(Continued)

*Primary Examiner* — Chi Q Nguyen
(74) *Attorney, Agent, or Firm* — Renner Kenner Greive Bobak Taylor & Weber

(57) ABSTRACT

A subfloor component comprises an insulating foam panel having first and second opposing faces and a plurality of intersecting grooves in the first face to define, in cross-section, a plurality of pedestals having at least one wall extending toward the second face, a moisture-resistant layer formed on the first face of the panel that conforms to the pedestals, and a hardboard layer on the second face of the panel.

16 Claims, 27 Drawing Sheets

Related U.S. Application Data continuation-in-part of application No. 13/412,038, filed on Mar. 5, 2012, now Pat. No. 8,650,823.

(51) Int. Cl.

| | | |
|---|---|---|
| B29C 44/02 | (2006.01) | |
| B29C 44/34 | (2006.01) | |
| B29C 65/02 | (2006.01) | |
| B29C 44/44 | (2006.01) | |
| E04F 15/18 | (2006.01) | |
| E04B 1/70 | (2006.01) | |
| E04B 5/48 | (2006.01) | |
| E04F 15/10 | (2006.01) | |
| E04F 15/06 | (2006.01) | |
| E04F 15/08 | (2006.01) | |
| B29L 7/00 | (2006.01) | |
| B29L 9/00 | (2006.01) | |
| B29L 31/10 | (2006.01) | |
| B29K 105/04 | (2006.01) | |
| B29K 25/00 | (2006.01) | |
| E04C 2/292 | (2006.01) | |
| E04C 2/284 | (2006.01) | |
| E04F 15/02 | (2006.01) | |
| B32B 15/04 | (2006.01) | |

(52) U.S. Cl.
CPC ....... *B29L 2009/00* (2013.01); *B29L 2031/10* (2013.01); *B32B 15/046* (2013.01); *E04C 2/284* (2013.01); *E04C 2/292* (2013.01); *E04F 15/02161* (2013.01); *E04F 2201/0107* (2013.01); *E04F 2201/0511* (2013.01)

(56) References Cited

U.S. PATENT DOCUMENTS

| | | | | |
|---|---|---|---|---|
| 5,473,847 | A | * 12/1995 | Crookston | E04C 2/205 454/260 |
| 5,643,139 | A | * 7/1997 | Stout | A63B 6/02 482/14 |
| 5,694,730 | A | 12/1997 | Del Rincon et al. | |
| 7,651,757 | B2 | 1/2010 | Jones et al. | |
| 8,555,581 | B2 | * 10/2013 | Amend | E04F 13/0875 52/302.1 |
| 8,650,823 | B2 | * 2/2014 | Amend | B32B 37/14 52/309.4 |
| 8,769,895 | B2 | * 7/2014 | Amend | B29C 44/14 52/309.4 |
| 8,869,483 | B2 | * 10/2014 | Amend | E04B 2/8617 52/275 |
| 9,057,193 | B2 | * 6/2015 | Amend | B05D 1/02 |
| 9,057,196 | B2 | * 6/2015 | Amend | E04F 15/02038 |
| 2007/0062139 | A1 | 3/2007 | Jones et al. | |
| 2008/0034690 | A1 | 2/2008 | Gartz et al. | |
| 2012/0073217 | A1 | * 3/2012 | Wilson | E04F 13/0864 52/105 |

FOREIGN PATENT DOCUMENTS

| | | |
|---|---|---|
| DE | 19721736 A1 | 11/1998 |
| DE | 29820303 U1 | 2/1999 |
| EP | 540941 | 5/1993 |
| WO | WO2006076487 | 7/2006 |

* cited by examiner

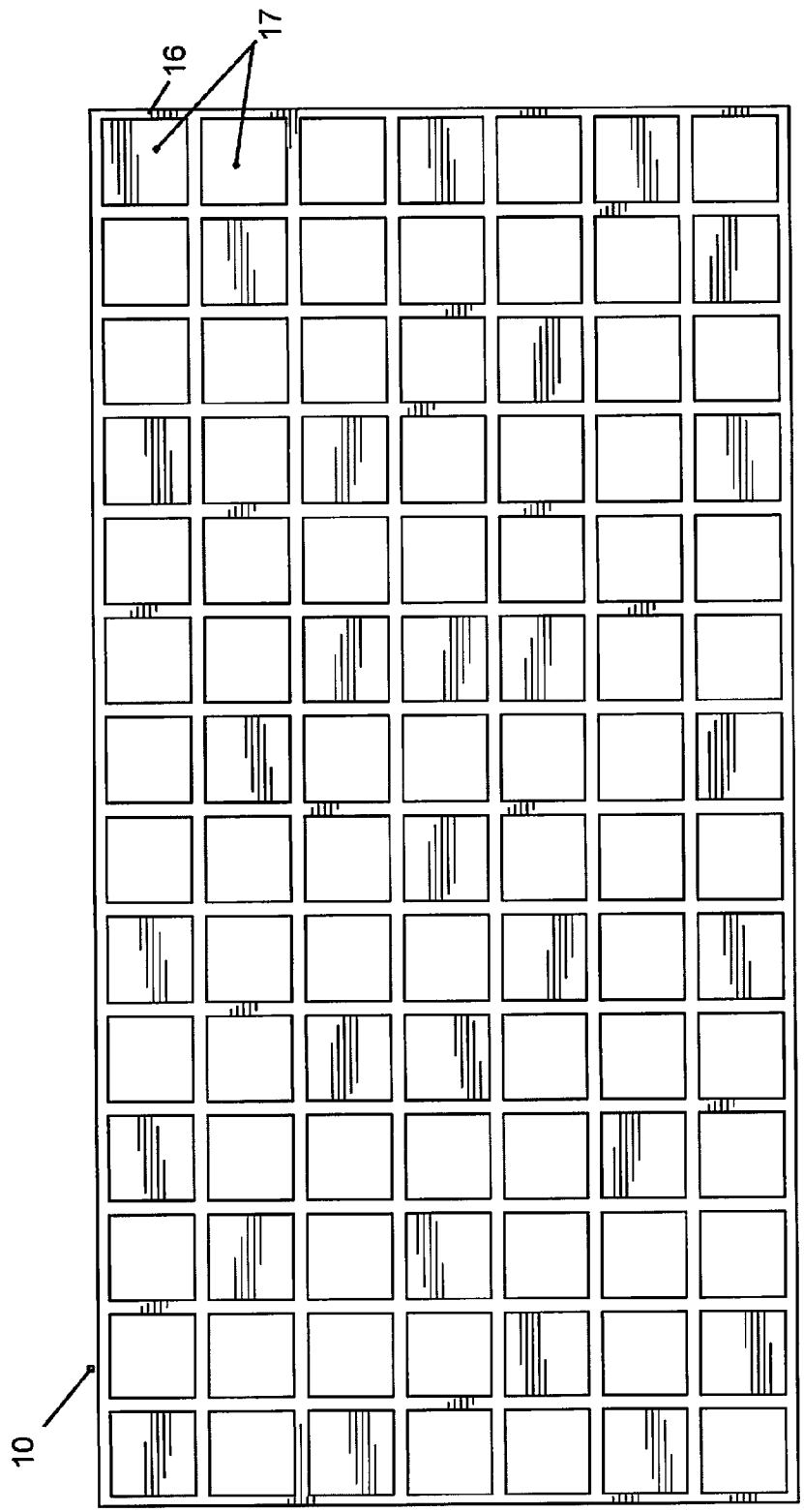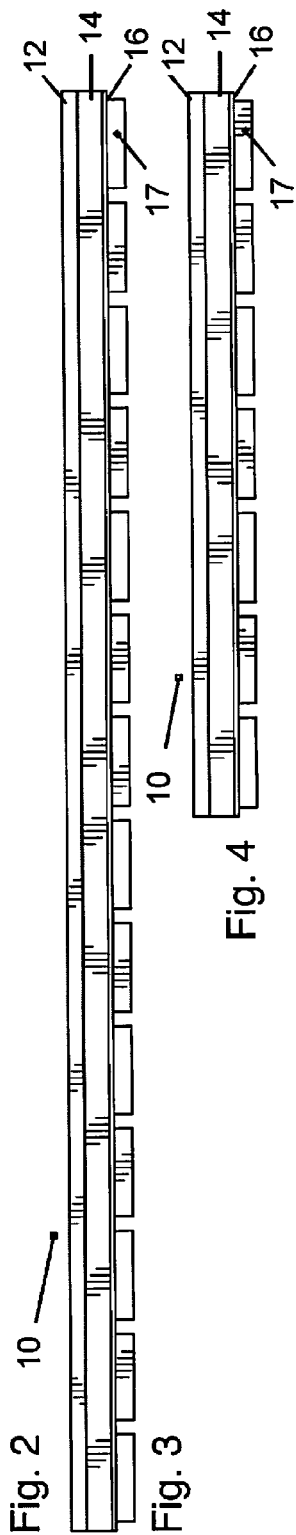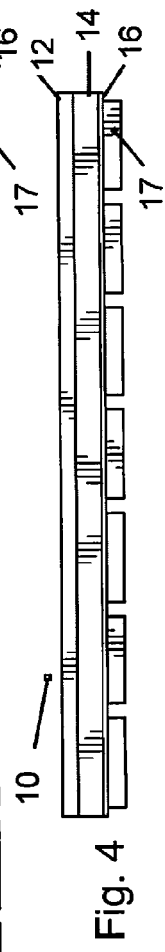

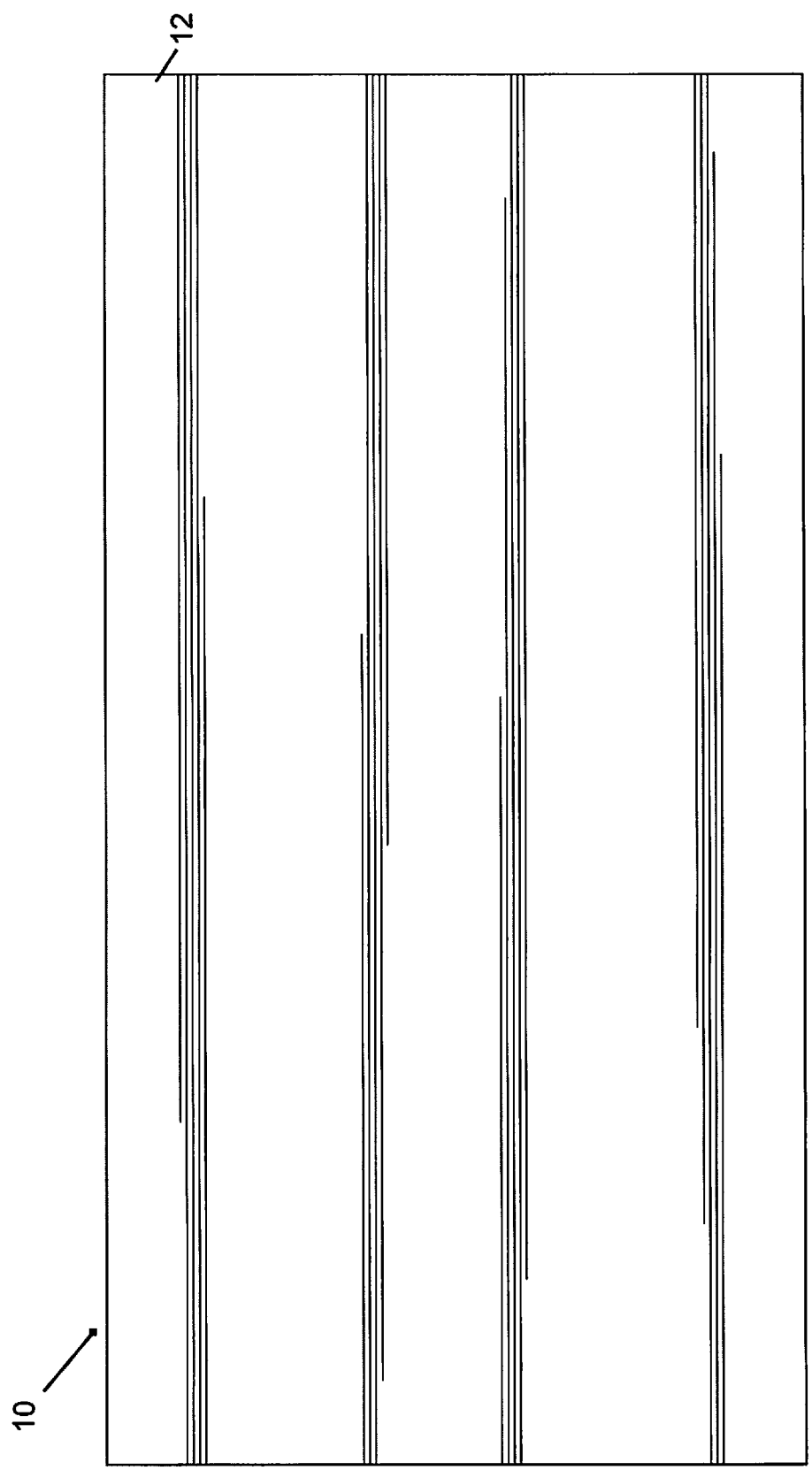

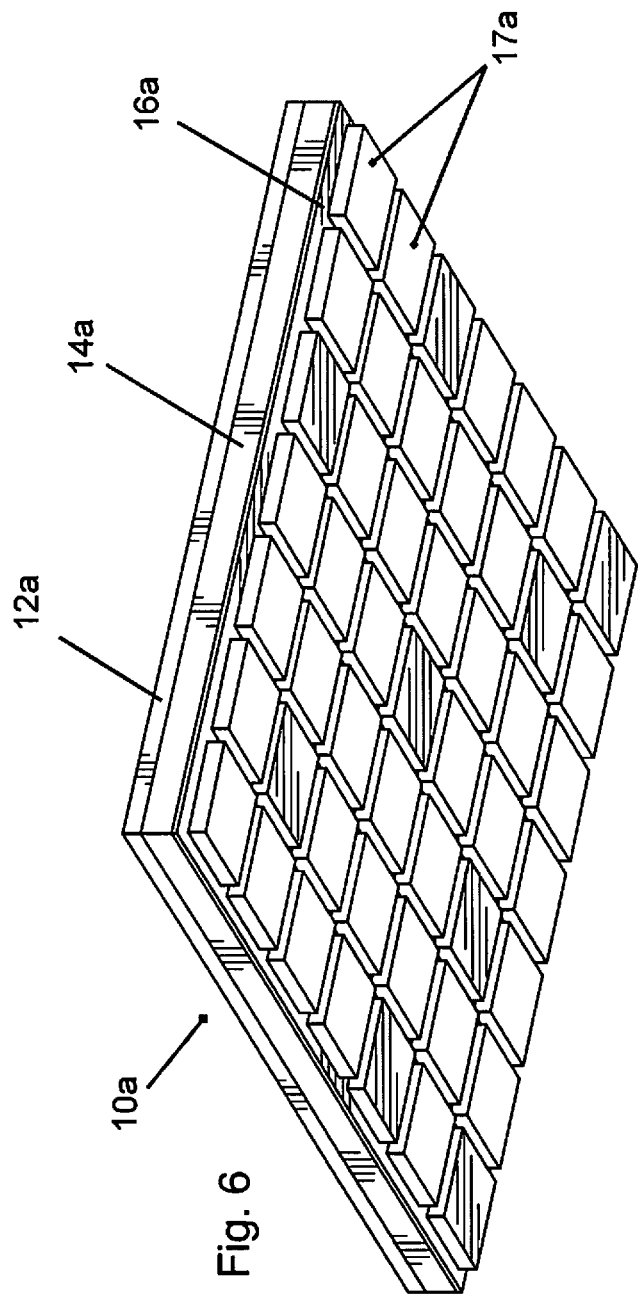

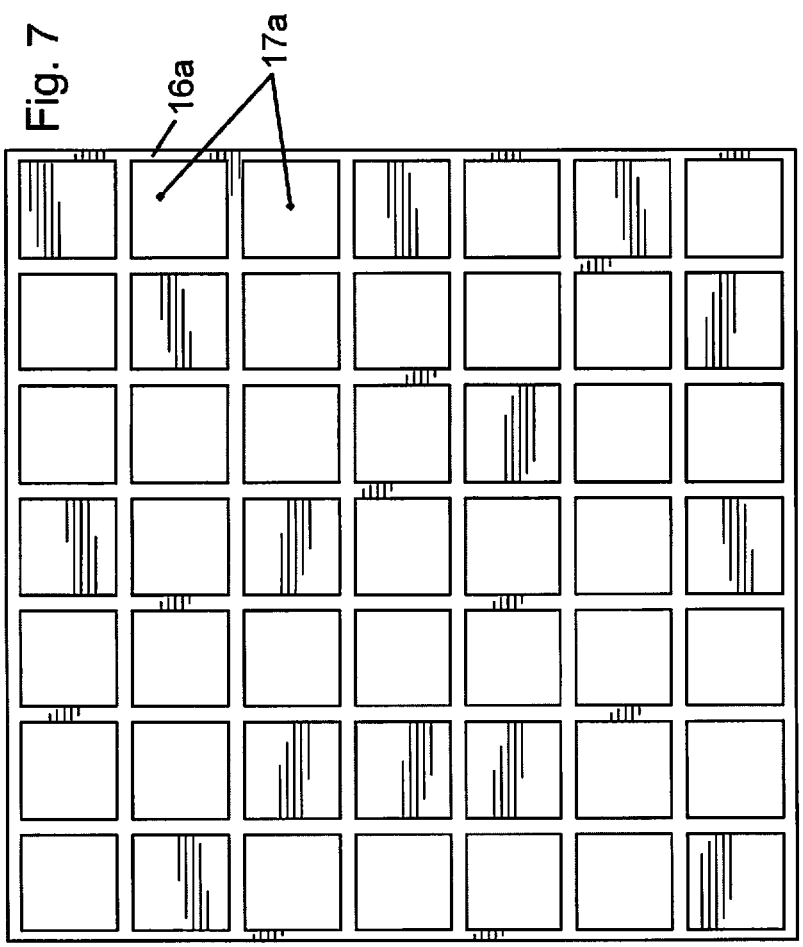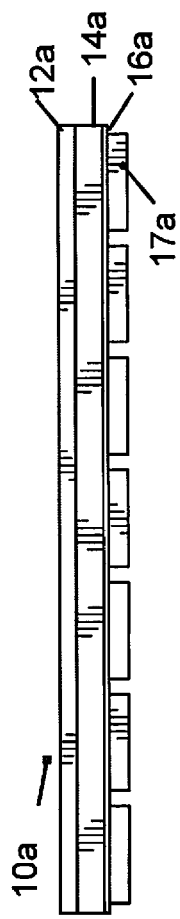

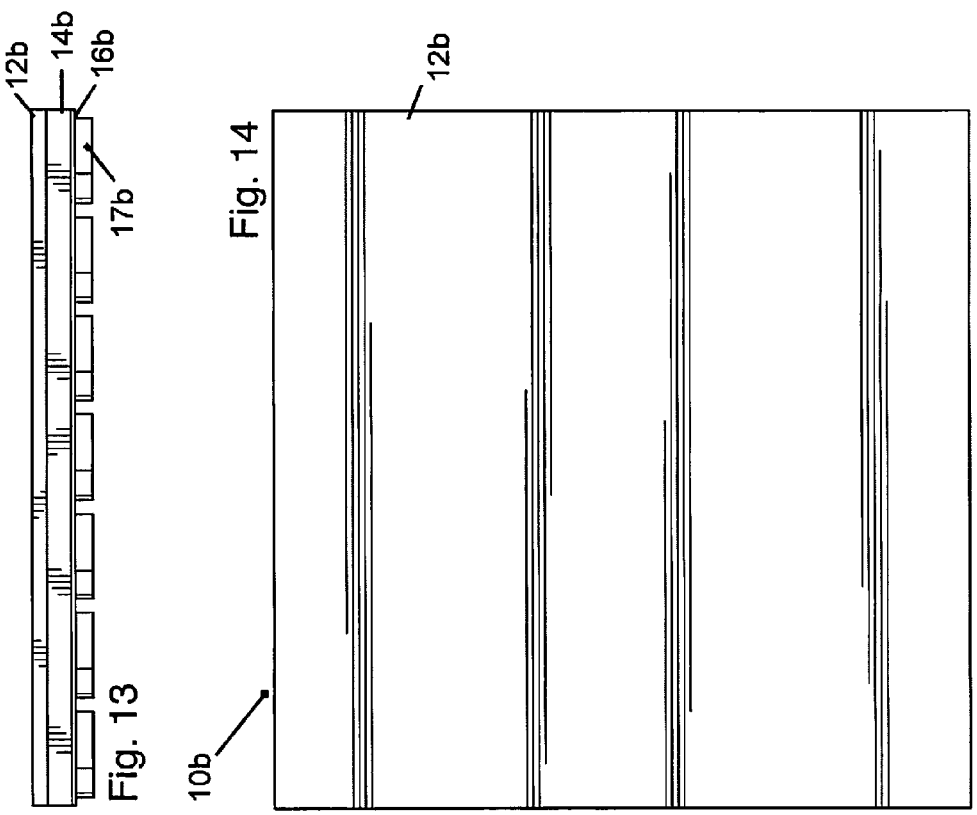
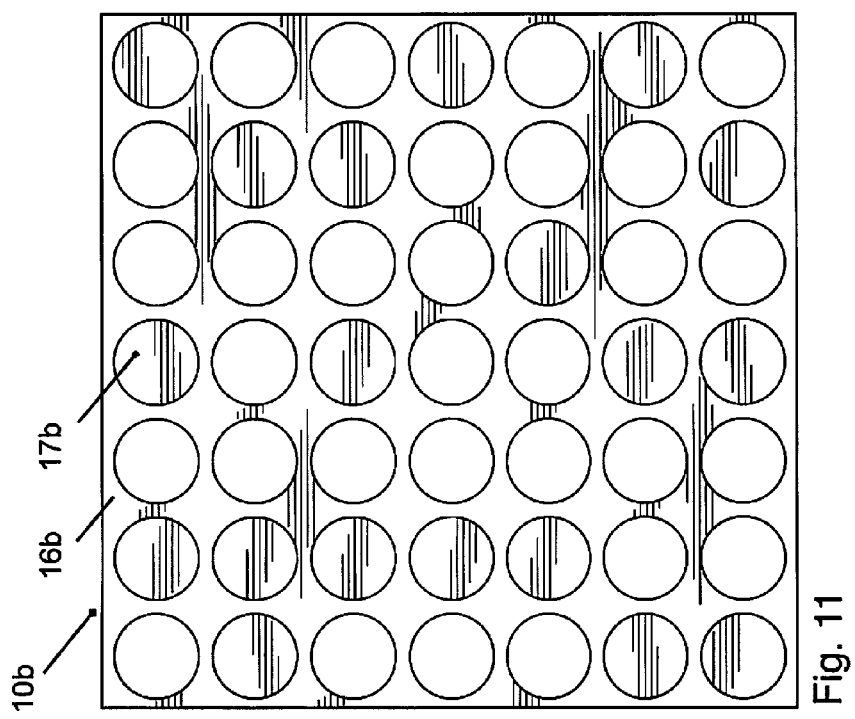
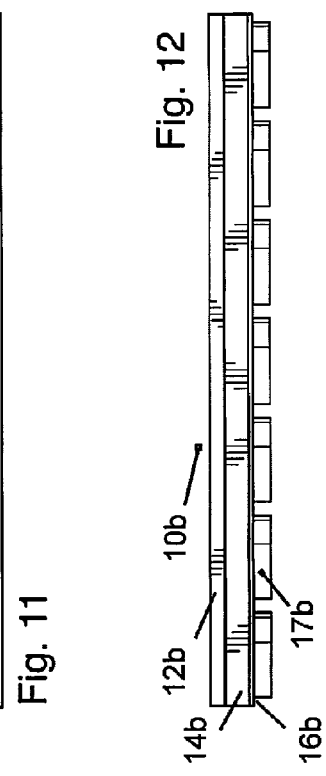

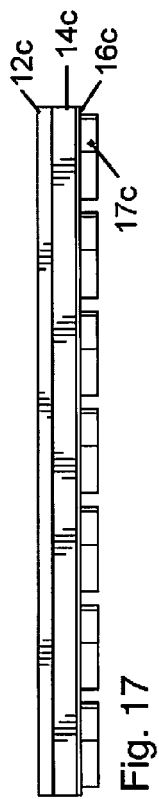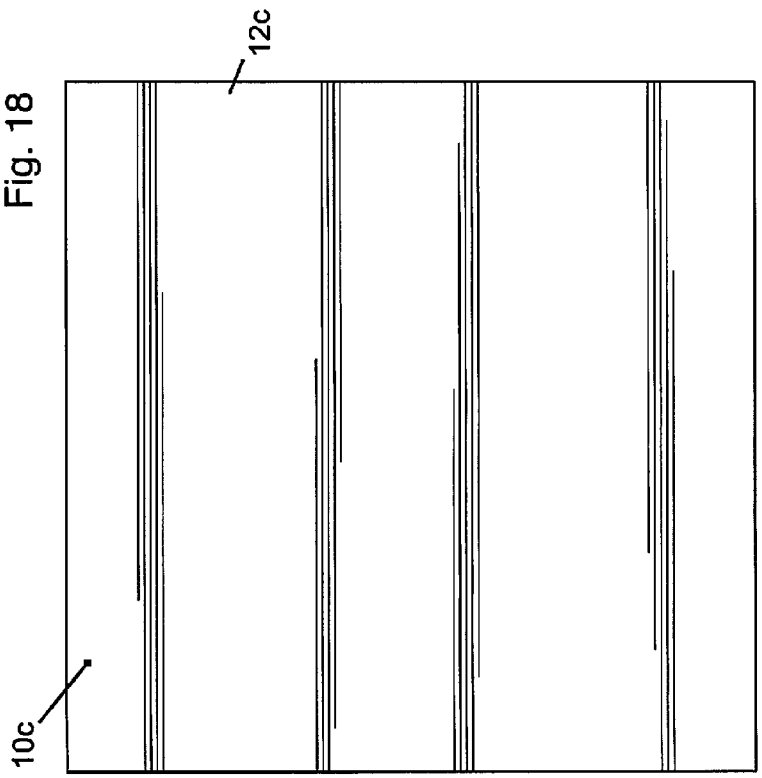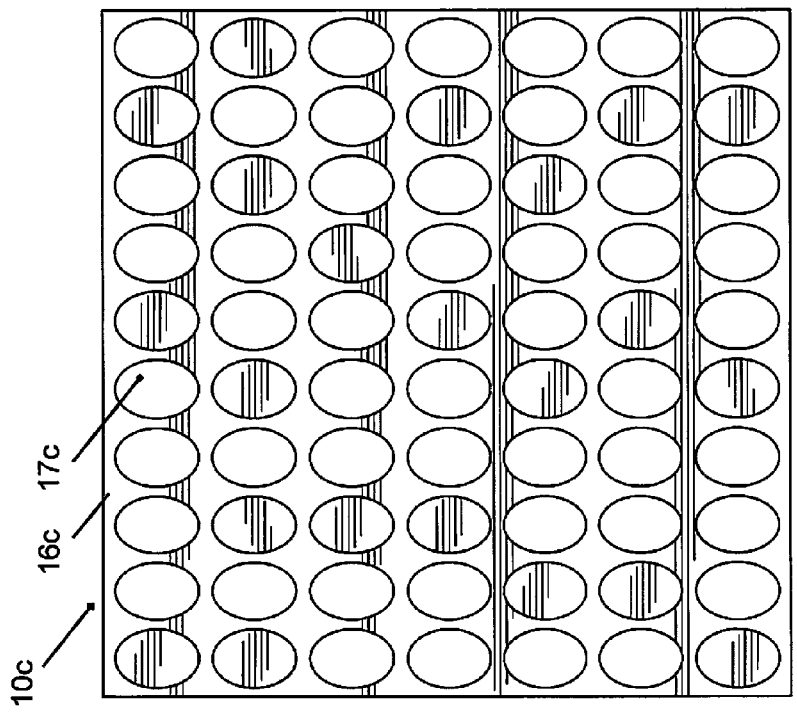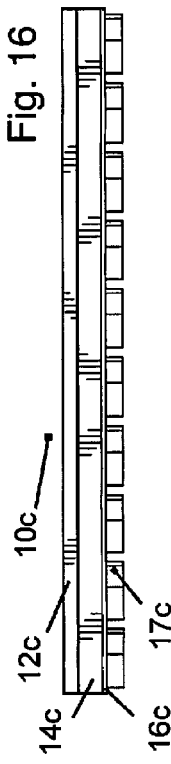

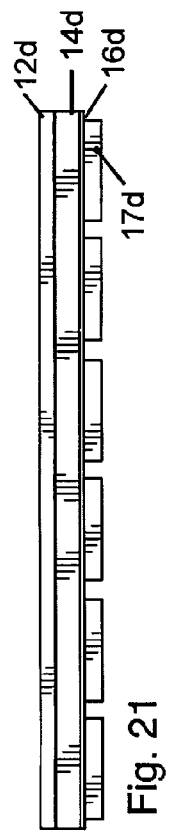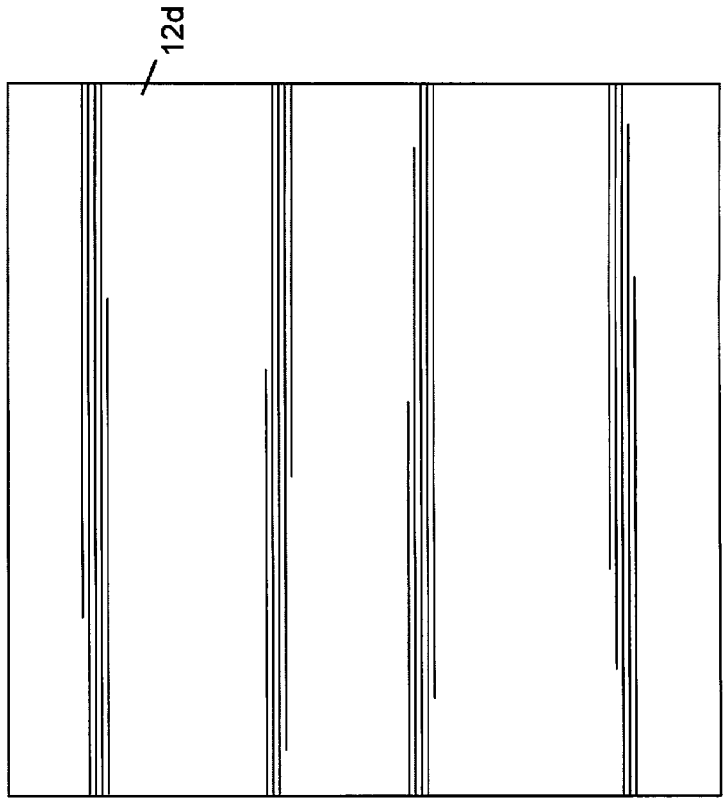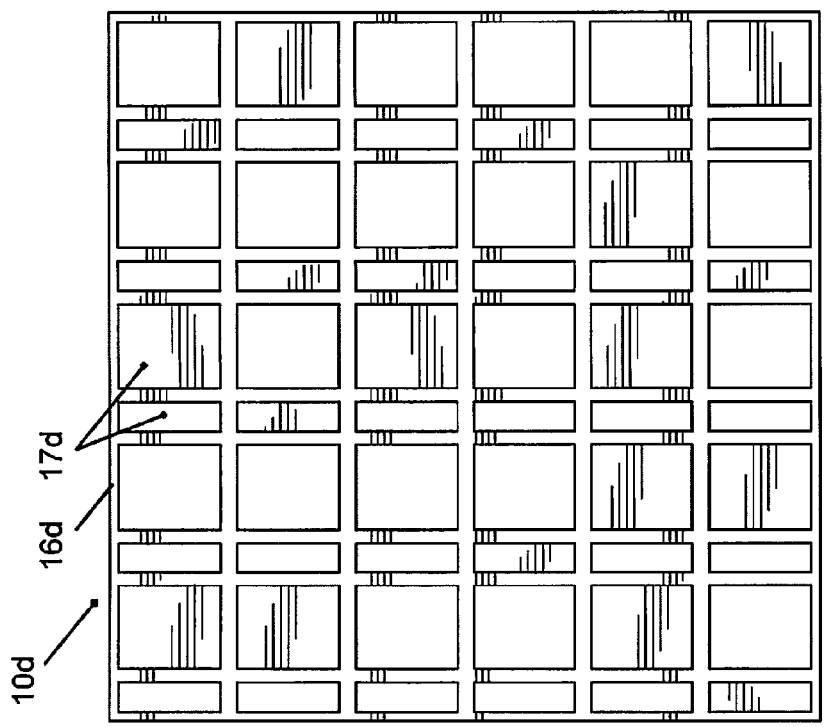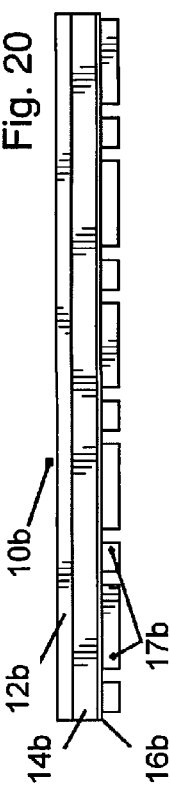

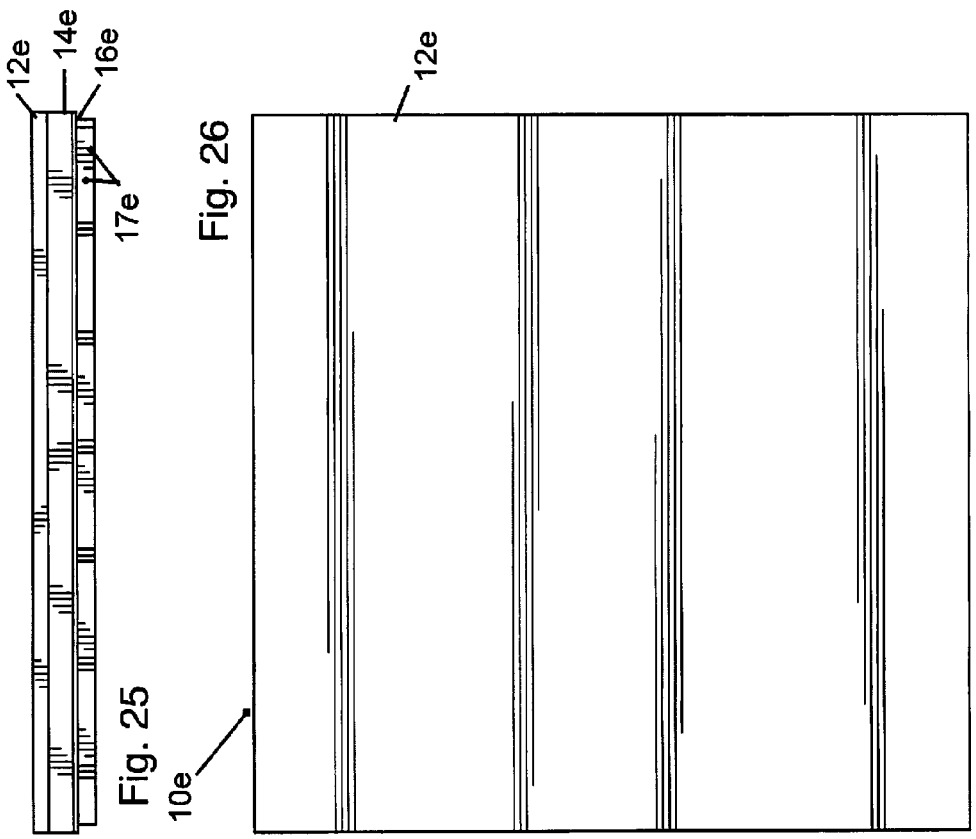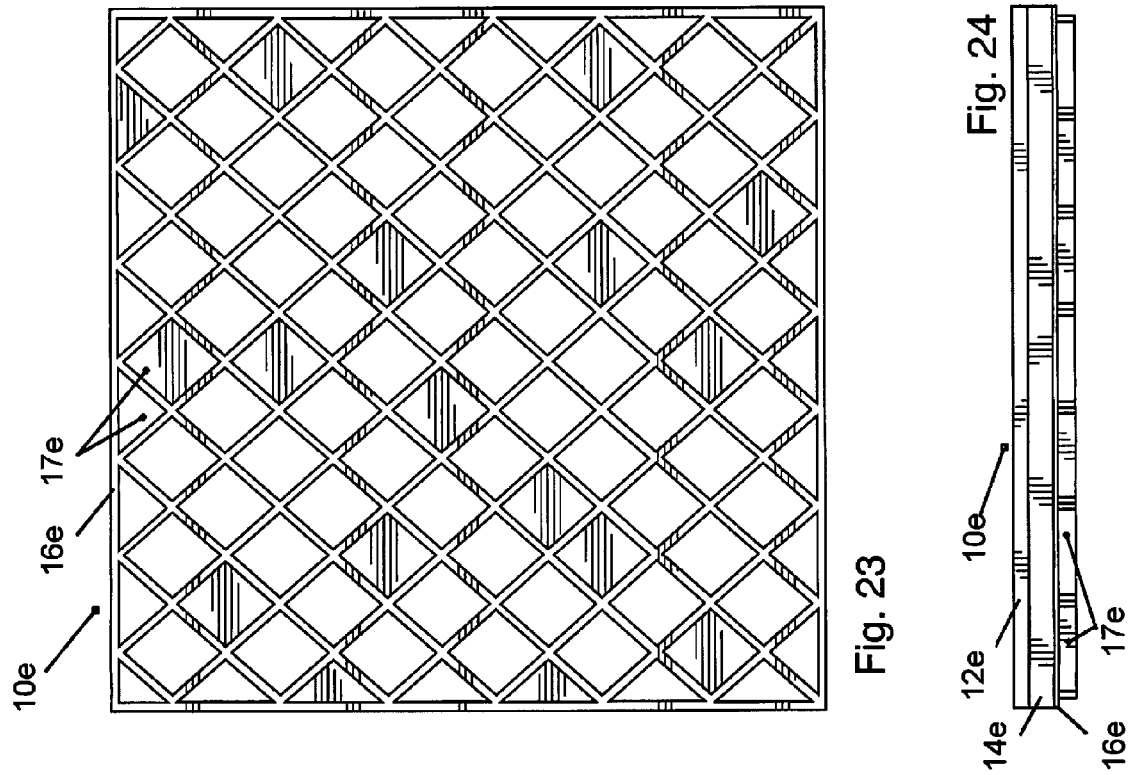

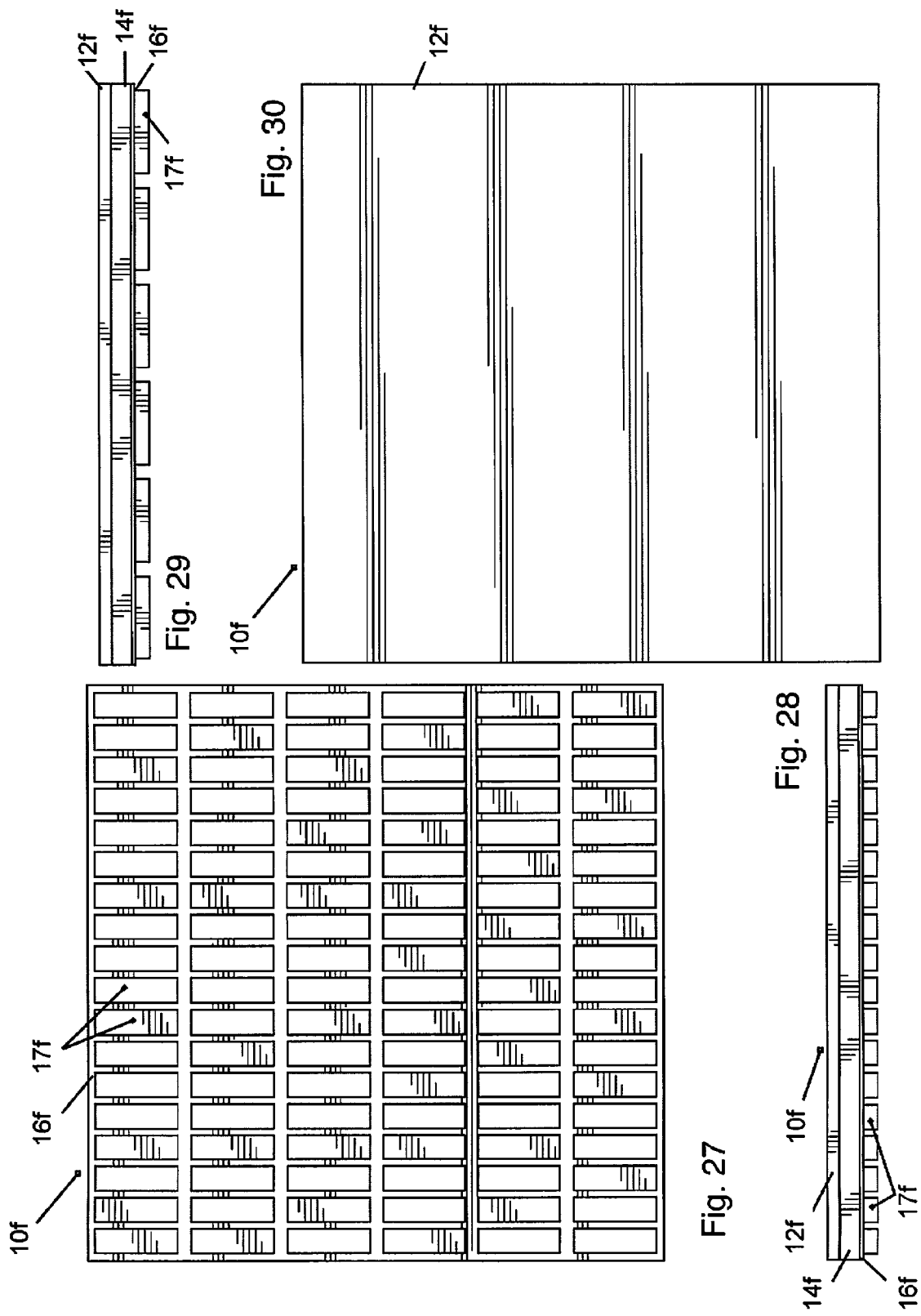

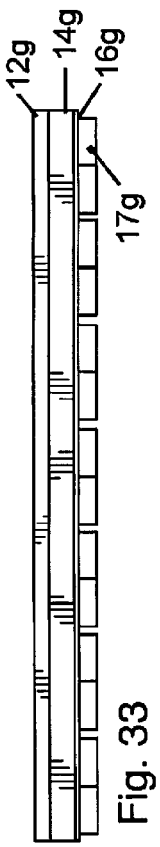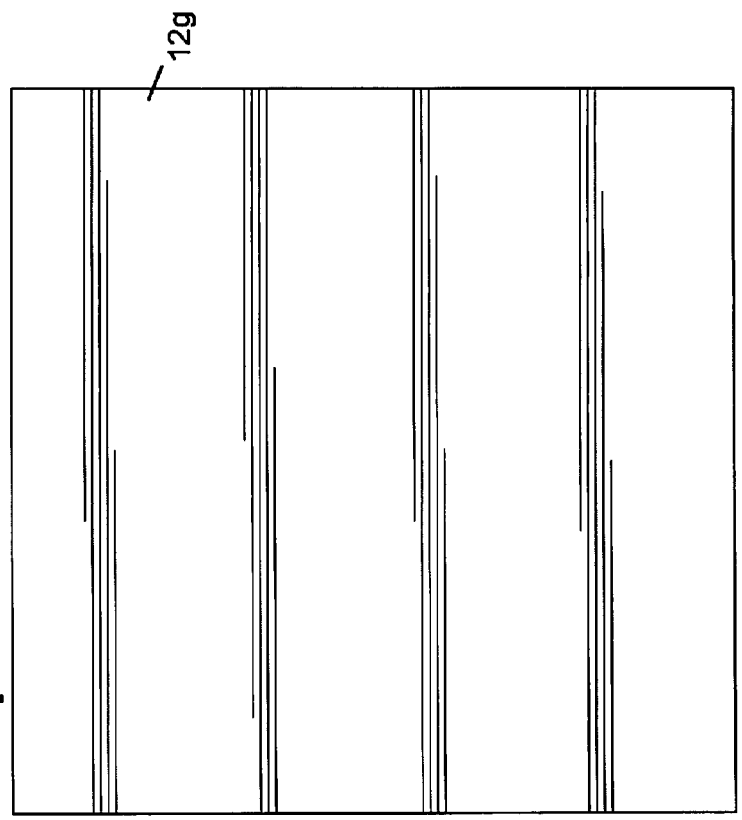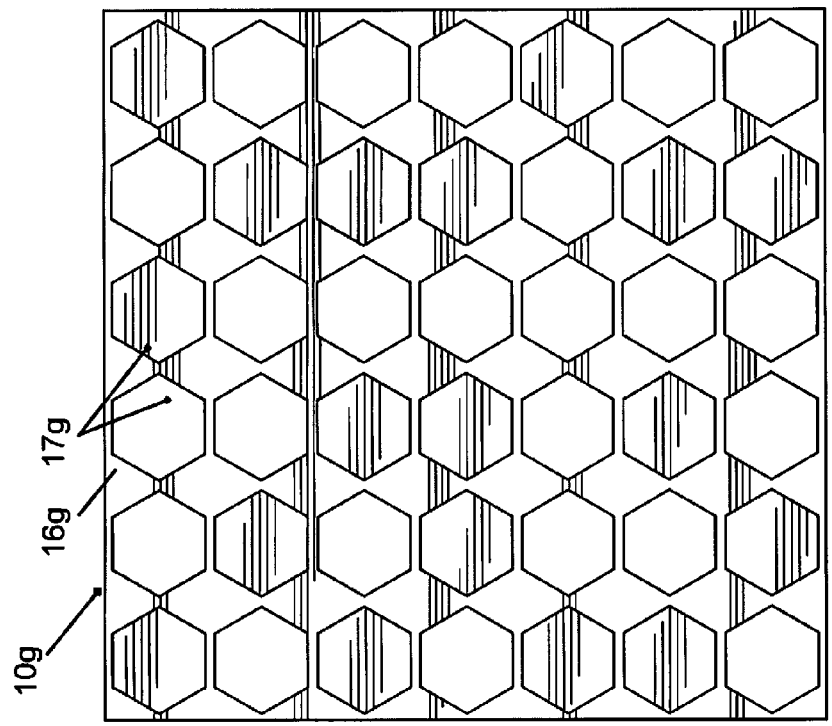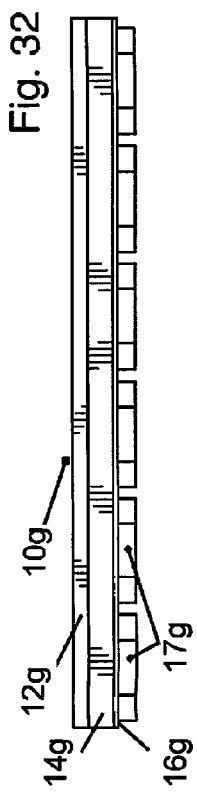

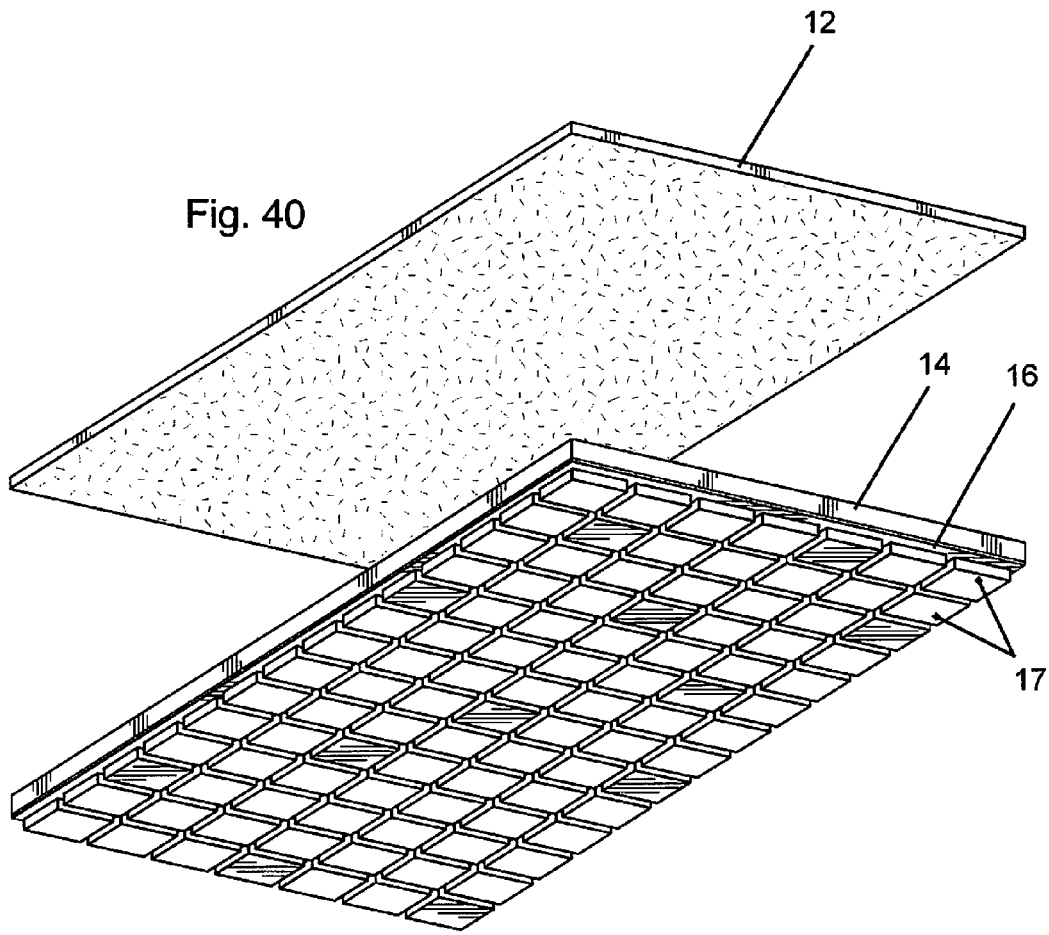
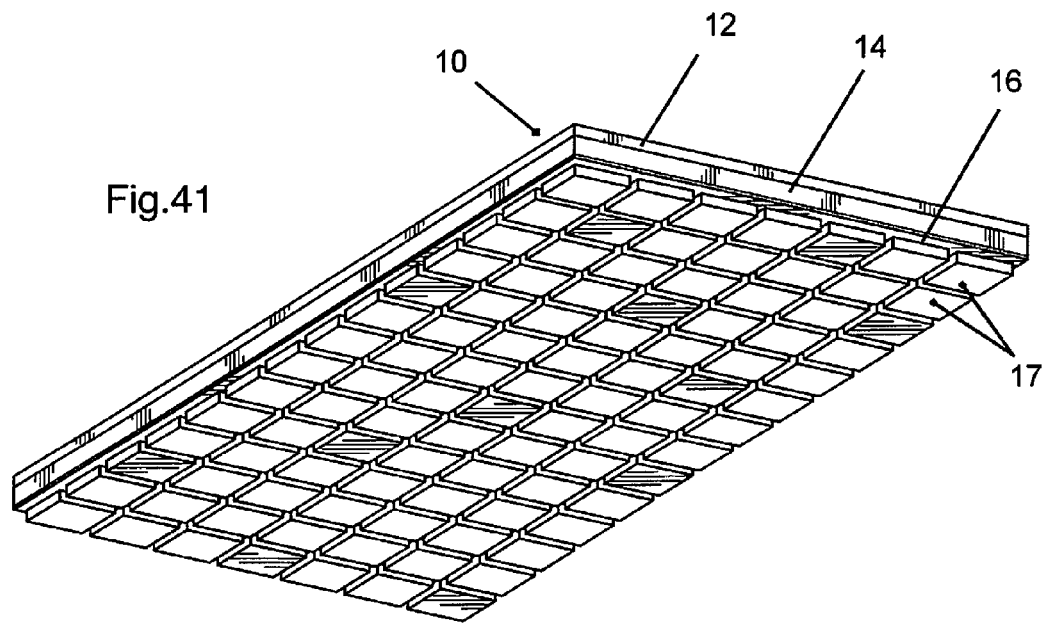

SUBFLOOR COMPONENT AND METHOD FOR MANUFACTURING SAME

CROSS-REFERENCE TO RELATED APPLICATIONS

This application is a continuation-in-part of U.S. application Ser. No. 13/489,712, filed Jun. 6, 2012, which is a continuation-in-part of U.S. application Ser. No. 13/412,038 filed Mar. 5, 2012, now U.S. Pat. No. 8,650,823, the contents of which are incorporated herein by reference in their entireties.

FIELD OF THE INVENTION

The following is directed in general to building construction and renovation, and more particularly to a subfloor component and a method of manufacturing a subfloor component.

BACKGROUND OF THE INVENTION

A subfloor component is a panel or other component meant to be placed on top of a concrete floor or other foundation before a finished floor of, for example, hardwood or tile is installed. The subfloor component may have projections for permitting the flow of moisture underneath the component so as to prevent moisture from standing underneath the subfloor component and causing problems with mold. While subfloor components of varying types are known, improvements are desirable.

SUMMARY OF THE INVENTION

According to an aspect, there is provided a subfloor component comprising: an insulating foam panel having first and second opposing faces and a plurality of intersecting grooves in the first face to define, in cross-section, a plurality of pedestals having at least one wall extending toward the second face; a moisture-resistant layer formed on the first face of the panel that conforms to the pedestals; and a hardboard layer on the second face of the panel.

The moisture-resistant layer may comprise a layer of melted or fused insulating foam. The layer of fused insulating foam may extend partially into the insulating foam panel from the first face. The moisture-resistant layer may be substantially moisture-impervious. The moisture-resistant layer may conform to the tops and walls of the pedestals and to the bottoms of the grooves. The moisture-resistant layer may be formed by heating or chemically treating the first face of the insulating foam panel.

The panel may comprise expanded polystyrene (EPS).

The hardboard layer may comprise material selected from the group consisting of: OSB (oriented strand board), plywood, fiber cement board, cement board, metal sheeting, and magnesium oxide board. The hardboard layer and the panel may be attached to each other with glue.

The pedestals may be shaped as at least one of circles, ellipses, rectangles, diamonds, squares, and hexagons. Each of the plurality of pedestals may have a single wall. The pedestals may be generally uniformly distributed across the first face of the panel.

The subfloor component may be shaped to connect to another subfloor component. The hardboard layer may comprise a tongue/groove configuration for connecting to another hardboard layer of another subfloor component. The hardboard layer may include a groove that is open along at least one side-facing surface of the hardboard layer, further comprising: a connector dimensioned to insert into the groove. The connector may comprise: a central body; and tongues extending outwards from the central body, wherein each tongue is dimensioned to be inserted into a respective groove in a hardboard layer of a subfloor component.

In another aspect, there is provided a method of manufacturing a subfloor component, comprising: providing a mold configured to form an insulating foam panel, the mold including pedestal-forming structures for forming the panel to have, in cross-section, a first face having a plurality of pedestals with walls that extend toward a second opposing face of the panel; placing heat-expandable beads into the mold against the pedestal-forming structures; applying heat to the mold to expand the heat-expandable beads to form the panel, wherein the expansion of the heat-expandable beads causes the expanding beads to enter into and conform to the pedestal-forming structures thereby to form the pedestals of the panel; removing the panel from the mold; forming a moisture-resistant layer on the first face of the panel, the moisture-resistant layer conforming to the pedestals; and attaching a hardboard layer to the second face of the panel.

The forming may comprise applying heat to the first face of the panel to melt or fuse the insulating foam. Applying heat to the first face of the panel may comprise placing a heat source in contact with and/or in non-contact proximity with the first face of the panel.

The forming may comprise applying a chemical treatment to the first face of the panel to partially dissolve or fuse the insulating foam.

The heat-expandable beads may be expandable polystyrene (EPS) beads.

Attaching the hardboard layer may comprise applying adhesive to one or both of the hardboard layer and the second face of the panel. The hardboard layer comprises material selected from the group consisting of: OSB (oriented strand board), plywood, fiber cement board, cement board, metal sheeting, and magnesium oxide board.

The method may further comprise: shaping the hardboard layer with a tongue/groove configuration for connecting to another hardboard layer of another subfloor component. The method may further comprise: forming grooves on at least two sides of said hardboard layer, each groove for connecting to at least one connector. Each connector may be a connector strip comprising opposing tongues, the connector strip being configured for connecting adjacent subfloor components. Forming grooves may comprise forming grooves on four sides of said hardboard layer.

In another aspect, there is provided a method of manufacturing a subfloor component, comprising: providing a mold configured to form an insulating foam panel, the mold including pedestal-forming structures for forming the panel to have, in cross-section, a first face having a plurality of pedestals with walls that extend toward a second opposing face of the panel; placing heat-expandable beads into the mold against the pedestal-forming structures; applying heat to the mold to expand the heat-expandable beads to form the panel, wherein the expansion of the heat-expandable beads causes the expanding beads to enter into and conform to the pedestal-forming structures thereby to form the pedestals of the panel; applying additional heat to a portion of the mold to melt or fuse the insulating foam to form a moisture-resistant layer on the first face of the panel, the moisture-resistant layer conforming to the pedestals; removing the panel with the moisture-resistant layer formed thereon from the mold; and attaching a hardboard layer to the second face of the panel.

The heat-expandable beads may be expandable polystyrene (EPS) beads.

Attaching the hardboard layer may comprise applying adhesive to one or both of the hardboard layer and the second face of the panel. The hardboard layer comprises material selected from the group consisting of: OSB (oriented strand board), plywood, fiber cement board, cement board, metal sheeting, and magnesium oxide board.

The method may further comprise: shaping the hardboard layer with a tongue/groove configuration for connecting to another hardboard layer of another subfloor component. The method may further comprise: forming grooves on at least two sides of said hardboard layer, each groove for connecting to at least one connector. Each connector may be a connector strip comprising opposing tongues, the connector strip being configured for connecting adjacent subfloor components. Forming grooves may comprise forming grooves on four sides of said hardboard layer.

In another aspect, there is provided a method of manufacturing a subfloor component, comprising: providing an insulating foam body; providing a mold configured to shape the insulating foam panel, the mold including pedestal-forming structures for forming the panel to have, in cross-section, a first face having a plurality of pedestals with walls that extend toward a second opposing face of the panel; placing the insulating foam body into the mold against the pedestal-forming structures; applying heat and pressure to the mold, wherein the application of heat and pressure causes the insulating foam body to conform to the pedestal-forming structures and thereby form the pedestals of an insulating foam panel and a moisture-resistant layer on the first face of the panel, the moisture-resistant layer conforming to the pedestals; removing the panel with the moisture-resistant layer formed thereon from the mold; and attaching a hardboard layer to the second face of the panel.

The heat-expandable beads may be expandable polystyrene (EPS) beads.

Attaching the hardboard layer may comprise applying adhesive to one or both of the hardboard layer and the second face of the panel. The hardboard layer comprises material selected from the group consisting of: OSB (oriented strand board), plywood, fiber cement board, cement board, metal sheeting, and magnesium oxide board.

The method may further comprise: shaping the hardboard layer with a tongue/groove configuration for connecting to another hardboard layer of another subfloor component. The method may further comprise: forming grooves on at least two sides of said hardboard layer, each groove for connecting to at least one connector. Each connector may be a connector strip comprising opposing tongues, the connector strip being configured for connecting adjacent subfloor components. Forming grooves may comprise forming grooves on four sides of said hardboard layer.

A subfloor component may be fabricated according to any one of the above-described methods.

BRIEF DESCRIPTION OF THE DRAWINGS

Embodiments will now be described more fully with reference to the accompanying drawings in which:

FIG. 2 is a bottom view of the subfloor component of FIG. 1;

FIG. 3 is a side view of the subfloor component of FIG. 1;

FIG. 4 is an end view of the subfloor component of FIG. 1;

FIG. 5 is a top view of the subfloor component of FIG. 1;

FIG. 6 is a perspective view of the underside of another embodiment of a subfloor component;

FIG. 7 is a bottom view of the subfloor component of FIG. 6;

FIG. 8 is a side view of the subfloor component of FIG. 6;

FIG. 11 is a bottom view of another embodiment of a subfloor component;

FIG. 12 is a side view of the subfloor component of FIG. 11;

FIG. 13 is an end view of the subfloor component of FIG. 11;

FIG. 14 is a top view of the subfloor component of FIG. 11;

FIG. 15 is a bottom view of another embodiment of a subfloor component;

FIG. 16 is a side view of the subfloor component of FIG. 15;

FIG. 17 is an end view of the subfloor component of FIG. 15;

FIG. 18 is a top view of the subfloor component of FIG. 15;

FIG. 19 is a bottom view of another embodiment of a subfloor component;

FIG. 20 is a side view of the subfloor component of FIG. 19;

FIG. 21 is an end view of the subfloor component of FIG. 19;

FIG. 22 is a top view of the subfloor component of FIG. 19;

FIG. 23 is a bottom view of another embodiment of a subfloor component;

FIG. 24 is a side view of the subfloor component of FIG. 22;

FIG. 25 is an end view of the subfloor component of FIG. 22;

FIG. 26 is a top view of the subfloor component of FIG. 22;

FIG. 27 is a bottom view of another embodiment of a subfloor component;

FIG. 28 is a side view of the subfloor component of FIG. 27;

FIG. 29 is an end view of the subfloor component of FIG. 28;

FIG. 30 is a top view of the subfloor component of FIG. 29;

FIG. 31 is a bottom view of another embodiment of a subfloor component;

FIG. 32 is a side view of the subfloor component of FIG. 31;

FIG. 33 is an end view of the subfloor component of FIG. 31;

FIG. 34 is a top view of the subfloor component of FIG. 31;

FIG. 40 is a perspective view of the hardboard layer being aligned with the face of the insulating foam panel of FIG. 39 that is opposite to the panel's pedestals;

FIG. 41 is a perspective view of the subfloor component having been formed;

DETAILED DESCRIPTION OF THE EMBODIMENTS

Figure 1:
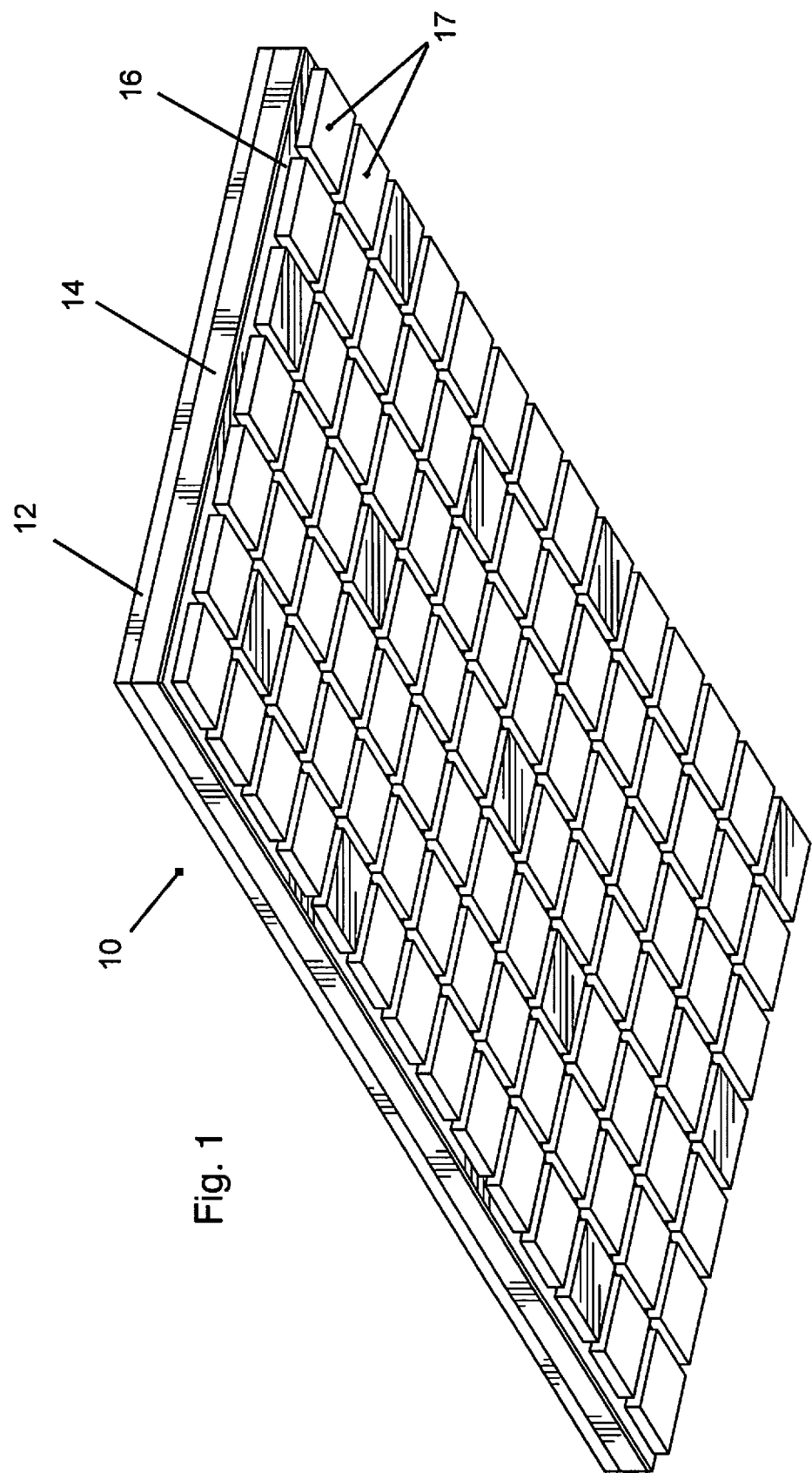
FIG. 1 is a perspective view of the underside of one embodiment of a subfloor component.
Figure 9:
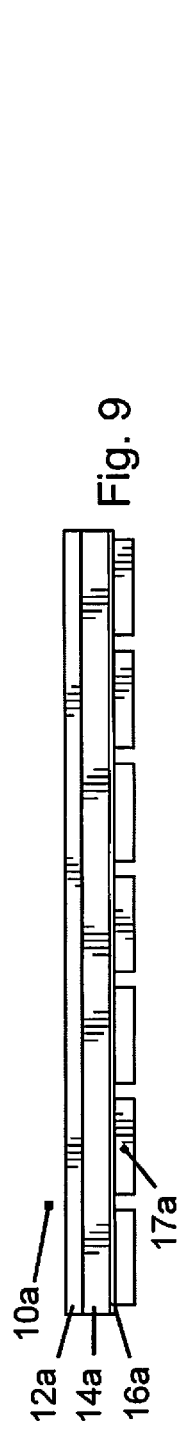
FIG. 9 is an end view of the subfloor component of FIG. 6.
Figure 10:
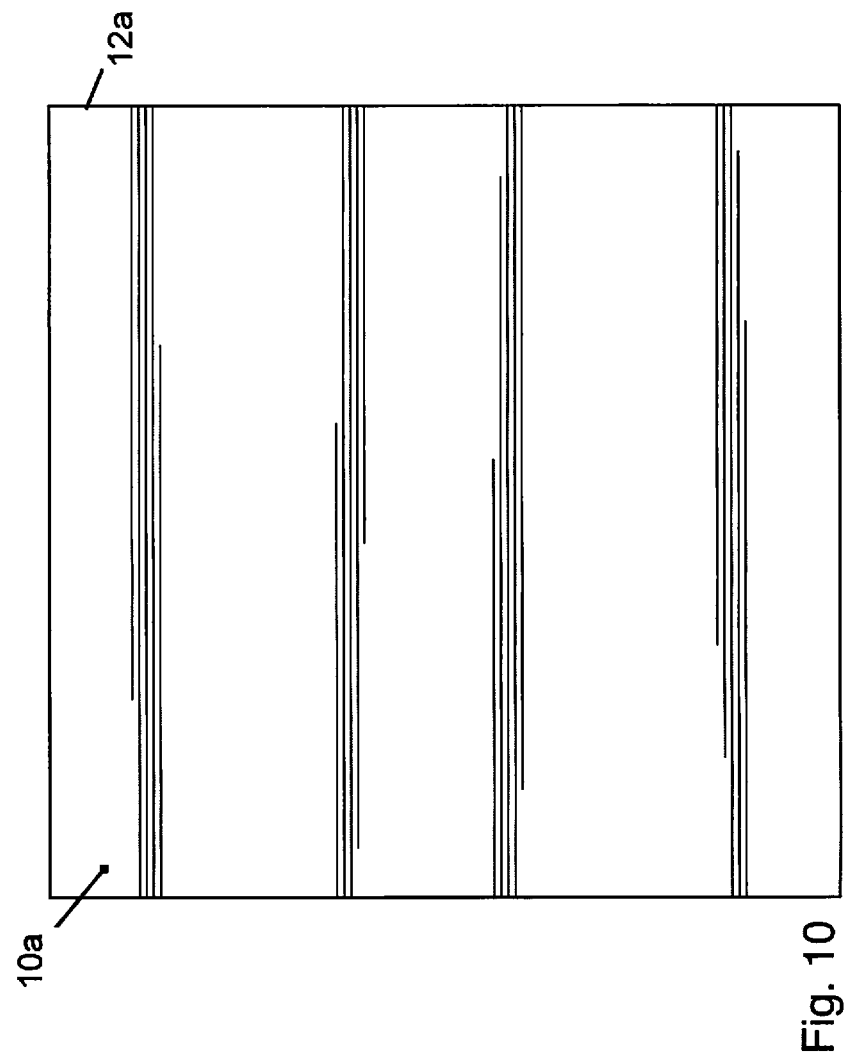
FIG. 10 is a top view of the subfloor component of FIG. 6.

In FIGS. 1 through 5, there is shown a subfloor component 10 according to an embodiment. Subfloor component 10 is rectangular in shape, and comprises a hardboard panel 12 and an insulating foam panel 14. The insulating foam panel 14 includes first and second opposing faces. Multiple intersecting grooves in the first face define, in cross-section, multiple pedestals 17 that have walls that extend toward the second face.

The insulating foam panel 14 has a moisture-resistant layer 16 or "skin" formed on the first face of the panel, and which generally conforms to the pedestals 17. In this embodiment, the moisture-resistant layer 16 is formed on the tops and walls of the pedestals 17 as well as on the bottom of the grooves, and is formed by heating the first face of the insulating foam panel 14 so as to cause the foam at and below the surface to melt or fuse. In this embodiment, the insulating foam panel 14 is formed of expanded polystyrene (EPS), and the moisture-resistant layer 16 is formed by heating the first face of the insulating foam panel 14 to a temperature near to or above the melting point of the EPS foam using a suitable heat source, such as for example a radiant heater, an infrared lamp, a hot air gun, a torch, and the like. Other suitable heat sources are known to those skilled in the art. As foam below the surface also fuses or melts, it will be understood that the moisture-resistant layer extends partially into the insulating foam panel from the first face.

The hardboard layer 12 is on the second face of the panel, which is opposite the panel 14 from the first face. In this embodiment, the hardboard panel 12 is oriented strand board (OSB), a material well-known to be employed in building construction. Also in this embodiment, the hardboard panel 12 is glued to the insulating foam panel 14.

The subfloor component 10 is to be placed on a foundation floor or other such structure with the pedestals 17 downwards and with the moisture-resistant layer 16 between the insulating foam layer 14 and the foundation floor. Moisture on the foundation floor is able to pass between the pedestals 17 and can contact the moisture-resistant layer 16 in order to drain away from underneath the subfloor component 10. The moisture-resistant layer 16 effectively resists the passage of moisture into the insulating foam panel 14 from the foundation floor thereby keeping the insulating foam panel 14 suitably dry. Thus, it will be understood that the moisture-resistant layer 16 is substantially moisture-impervious, meaning that the moisture-resistant layer 16 permits only an insignificant amount of moisture, if any, to pass therethrough.

The formation of the moisture-resistant layer 16 on the insulating foam panel 14 enables the pedestals 17 to have increased resistance to breakage. As would be understood, as useful as expanded EPS is for insulation, it can be brittle. In this embodiment, the pedestals 17, which are shaped as squares, each have four (4) walls meeting at four (4) edges and four (4) top corners. Particularly the top corners and also the edges are most prone to being broken away during transportation, installation, or usage. The present inventor has discovered that, particularly for a subfloor component 10 that will be experiencing various physical pressures from above, advantages are gained by employing a moisture-resistant layer 16 that not only resists moisture reaching the insulating foam panel 14 but also increases the structural integrity of the pedestals 17. In this way, physical pressures both during construction (workers, wheel barrows, other machinery) and when construction is complete (home owners, employees, couches, filing cabinets etc.) can be better withstood by the pedestals 17.

In this embodiment, the walls of the intersecting grooves have a height of about 15 millimeters, giving the pedestals 17 a corresponding height. However, other heights are possible. For example, other embodiments may provide heights of between about 15 millimeters to about 20 millimeters. Furthermore, in this embodiment, the intersecting grooves have a width of about 15 millimeters, giving the pedestals 17 a corresponding spacing. However, other widths are possible. For example, other embodiments may provide widths of between about 15 millimeters to about 20 millimeters. It will be understood that having all grooves have the same width is not required.

While the above-described subfloor component 10 can be useful for many purposes, the present inventor has also developed additional embodiments. For example, FIGS. 6 through 10 show a subfloor component 10*a* according to another embodiment. Subfloor component 10*a* is square in shape, and comprises a hardboard panel 12*a* and an insulating foam panel 14*a* that has a moisture-resistant layer 16*a* formed thereon. Like the embodiment described in FIGS. 1 through 5, the insulating foam panel 14*a* includes first and second opposing faces. Multiple intersecting grooves in the first face define, in cross-section, multiple pedestals 17*a* that have walls that extend toward the second face. The moisture-resistant layer 16*a* is formed on the first face of the panel and conforms to the pedestals 17*a*. The hardboard layer 12*a* is on the second face of the panel, which is opposite the panel 14*a* from the first face. As can be seen, subfloor component 10*a* is similar to subfloor component 10, but is square instead of rectangular.

FIGS. 11 through 14 show a subfloor component 10*b* according to another embodiment. Subfloor component 10*b* is square in shape, and comprises a hardboard panel 12*b* and an insulating foam panel 14*b* that has a moisture-resistant layer 16*b* formed thereon. Like the embodiment described in FIGS. 1 through 5, the insulating foam panel 14*b* includes first and second opposing faces. Multiple intersecting grooves in the first face define, in cross-section, multiple pedestals 17*b* that have walls that extend toward the second face. The moisture-resistant layer 16*b* is formed on the first face of the panel and conforms to the pedestals 17*b*. The hardboard layer 12*b* is on the second face of the panel, which is opposite the panel 14*b* from the first face. As can be seen, subfloor component 10*b* is similar to subfloor component 10, but is square instead of rectangular. Furthermore, each of the pedestals 17*b* are circular, rather than square. The pedestals 17*b* being circular means that each pedestal 17*b* only has one wall, and thus there are no top corners. Because pedestal 17*b* does not have any top corners, breakage due to handling or use of the subfloor component 10*b* is even less likely.

FIGS. 15 through 18 show a subfloor component 10*c* according to another embodiment. Subfloor component 10*c* is square in shape, and comprises a hardboard panel 12*c* and an insulating foam panel 14*c* that has a moisture-resistant layer 16*c* formed thereon. Like the embodiment described in FIGS. 1 through 5, the insulating foam panel 14*c* includes first and second opposing faces. Multiple intersecting grooves in the first face define, in cross-section, multiple pedestals 17*c* that have walls that extend toward the second face. The moisture-resistant layer 16*c* is formed on the first face of the panel and conforms to the pedestals 17*c*. The hardboard layer 12*c* is on the second face of the panel, which is opposite the panel 14*c* from the first face. As can be seen, subfloor component 10*c* is similar to subfloor component 10, but is square instead of rectangular. Furthermore, each of the pedestals 17*c* are oval-shaped, rather than square. The pedestals 17*c* being oval-shaped means that each pedestal 17*c* only has one wall, and thus there are no top corners. Because pedestal 17*c* does not have any top corners, breakage due to handling or use of the subfloor component 10*c* is less likely.

FIGS. 19 through 22 show a subfloor component 10*d* according to another embodiment. Subfloor component 10*d* is square in shape, and comprises a hardboard panel 12*d* and an insulating foam panel 14*d* that has a moisture-resistant layer 16*d* formed thereon. Like the embodiment described in FIGS. 1 through 5, the insulating foam panel 14*d* includes first and second opposing faces. Multiple intersecting grooves in the first face define, in cross-section, multiple pedestals 17*d* that have walls that extend toward the second face. The moisture-resistant layer 16*d* is formed on the first face of the panel and conforms to the pedestals 17*d*. The hardboard layer 12*a* is on the second face of the panel, which is opposite the panel 14*d* from the first face. As can be seen, subfloor component 10*d* is similar to subfloor component 10, but is square instead of rectangular. Furthermore, there are two different sizes of pedestals 17*d*, namely a thin rectangle and a thick rectangle.

FIGS. 23 through 26 show a subfloor component 10*d* according to another embodiment. Subfloor component 10*e* is square in shape, and comprises a hardboard panel 12*e* and an insulating foam panel 14*e* that has a moisture-resistant layer 16*e* formed thereon. Like the embodiment described in FIGS. 1 through 5, the insulating foam panel 14*e* includes first and second opposing faces. Multiple intersecting grooves in the first face define, in cross-section, multiple pedestals 17*e* that have walls that extend toward the second face. The moisture-resistant layer 16*e* is formed on the first face of the panel and conforms to the pedestals 17*e*. The hardboard layer 12*e* is on the second face of the panel, which is opposite the panel 14*e* from the first face. As can be seen, subfloor component 10*e* is similar to subfloor component 10, but is square instead of rectangular. Furthermore, the pedestals 17*e* are diamond-shaped.

FIGS. 27 through 30 show a subfloor component 10*f* according to another embodiment. Subfloor component 10*f* is square in shape, and comprises a hardboard panel 12*f* and an insulating foam panel 14*f* that has a moisture-resistant layer 16*f* formed thereon. Like the embodiment described in FIGS. 1 through 5, the insulating foam panel 14*f* includes first and second opposing faces. Multiple intersecting grooves in the first face define, in cross-section, multiple pedestals 17*f* that have walls that extend toward the second face. The moisture-resistant layer 16*f* is formed on the first face of the panel and conforms to the pedestals 17*f*. The hardboard layer 12*f* is on the second face of the panel, which is opposite the panel 14*f* from the first face. As can be seen, subfloor component 10*f* is similar to subfloor component 10, but is square instead of rectangular. Furthermore, the pedestals 17*f* are all rectangles.

FIGS. 31 through 34 show a subfloor component 10*g* according to another embodiment. Subfloor component 10*g* is square in shape, and comprises a hardboard panel 12*g* and an insulating foam panel 14*g* that has a moisture-resistant layer 16*g* formed thereon. Like the embodiment described in FIGS. 1 through 5, the insulating foam panel 14*g* includes first and second opposing faces. Multiple intersecting grooves in the first face define, in cross-section, multiple pedestals 17*g* that have walls that extend toward the second face. The moisture-resistant layer 16*g* is formed on the first face of the panel and conforms to the pedestals 17*g*. The hardboard layer 12*g* is on the second face of the panel, which is opposite the panel 14*g* from the first face. As can be seen, subfloor component 10*g* is similar to subfloor component 10, but is square instead of rectangular. Furthermore, the pedestals 17*g* are all hexagons.

It will be understood that a subfloor component with pedestals of different shapes, including others not disclosed above, or mixtures of differently-shaped pedestals such as those described above, may be provided.

The various subfloor components described herein may generally be used alongside each other in a particular installation, provided that the overall thicknesses of two different panels are similar, and provided that using differently-shaped pedestals in two different subfloor components does not unduly impede the flow of moisture beneath the subfloor components. In one embodiment, subfloor components have tongue and groove configurations along the edges which abut against each other, such that the tongue of one panel can be received within the groove of the adjacent panel. The tongues/grooves may have square, rectangular configurations with or without rounded distal corners. The tongue and groove configuration may be formed prior to, or after, attaching the hardboard panel to the insulating foam panel.

Figure 35:
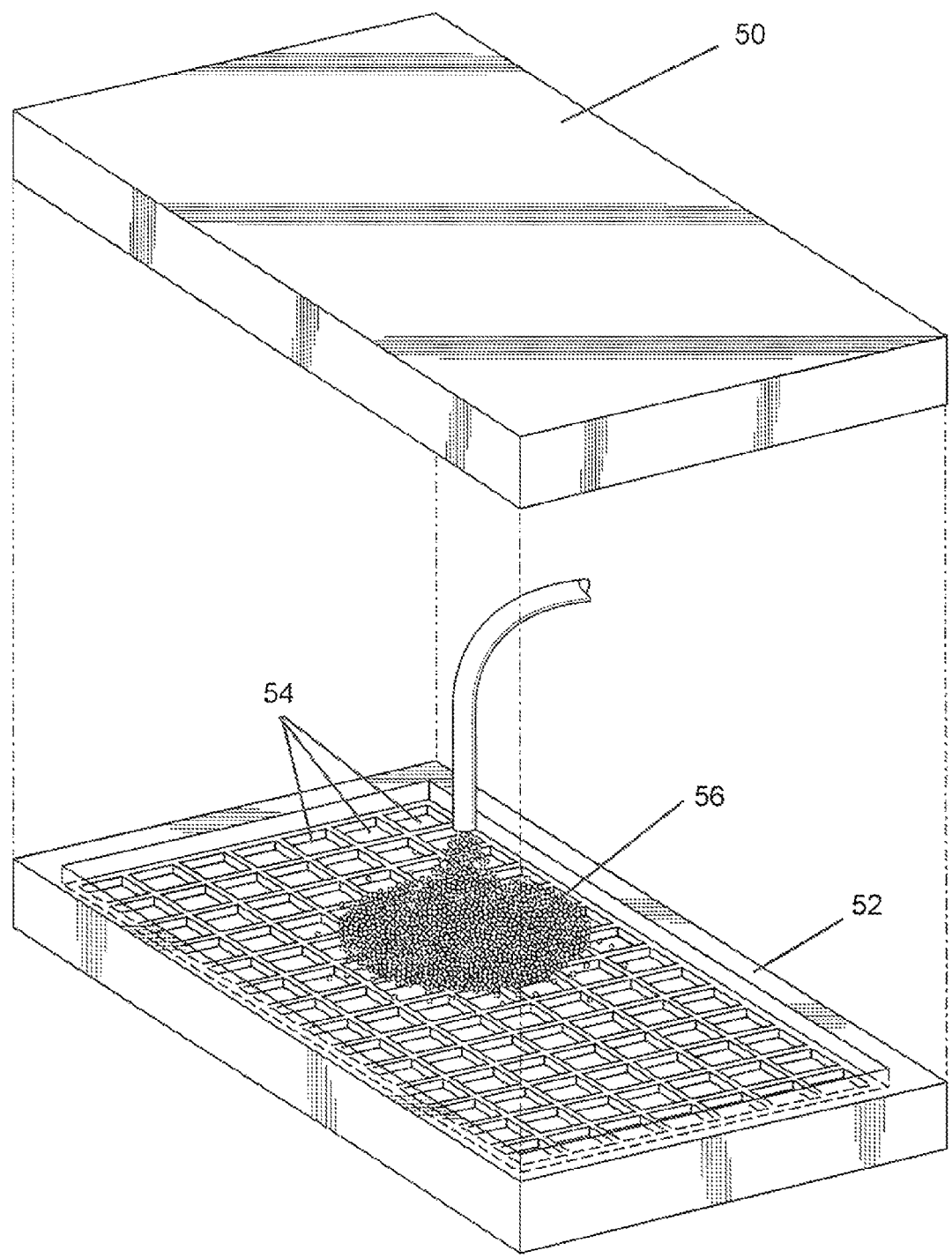
FIG. 35 is a perspective view of expandable polystyrene beads being poured into a mold structure, and against pedestal-forming structures within the mold structure, during manufacture of the subfloor component of FIG. 1.
Figure 42:
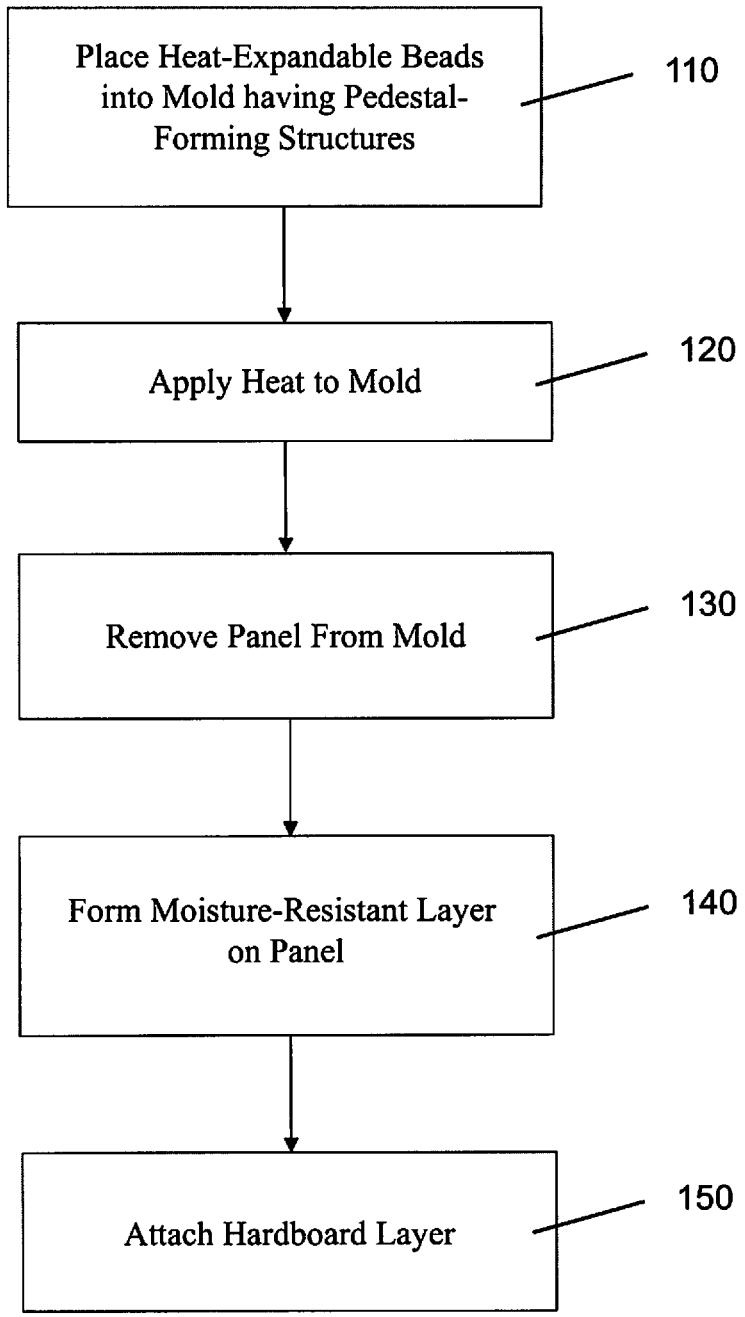
FIG. 42 is a flowchart of steps for manufacturing the subfloor component, according to the embodiment of FIGS. 35 to 41.

FIG. 42 shows a flowchart of steps of a method of manufacturing a subfloor component, such as subfloor component 10 described above. The treatment of the materials involved in the steps is illustrated in FIGS. 35 through 41. In FIG. 35, a mold structure is shown to have a top portion 50 and a bottom portion 52. It will be understood that the terms top and bottom may be interchanged with left and right, for example, in the case of a mold structure that stands vertically.

Figure 36:
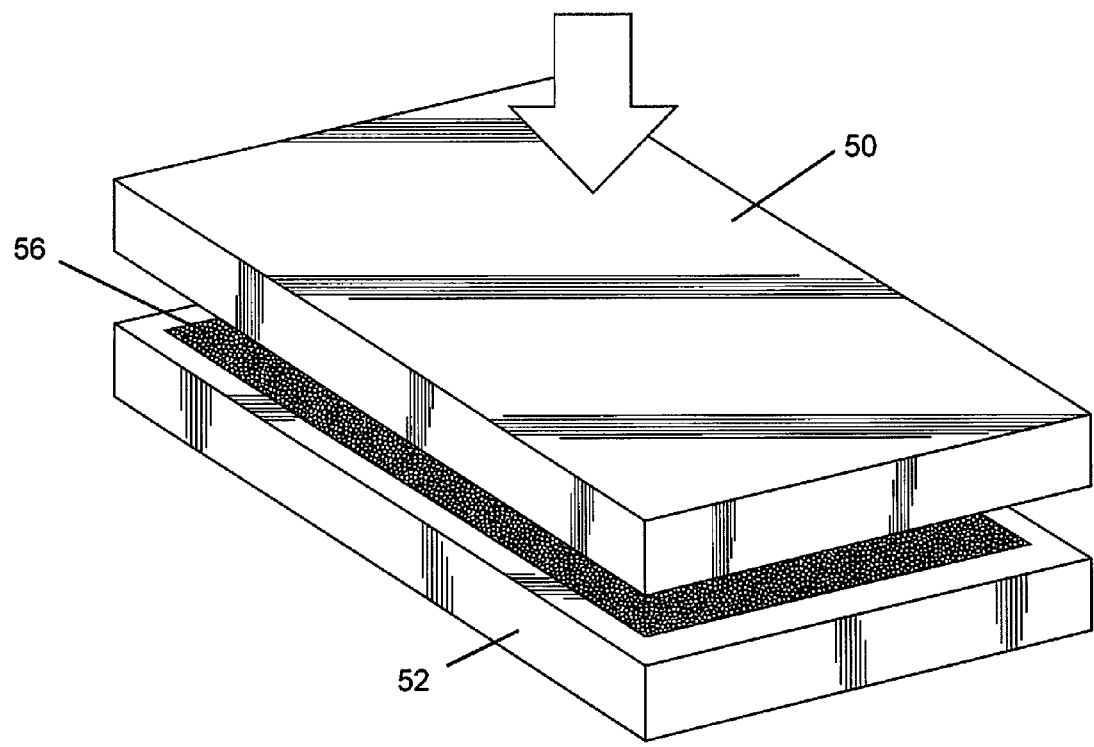
FIG. 36 is a perspective view of the mold structure of FIG. 35 being closed prior to applying heat to the mold.
Figure 37:
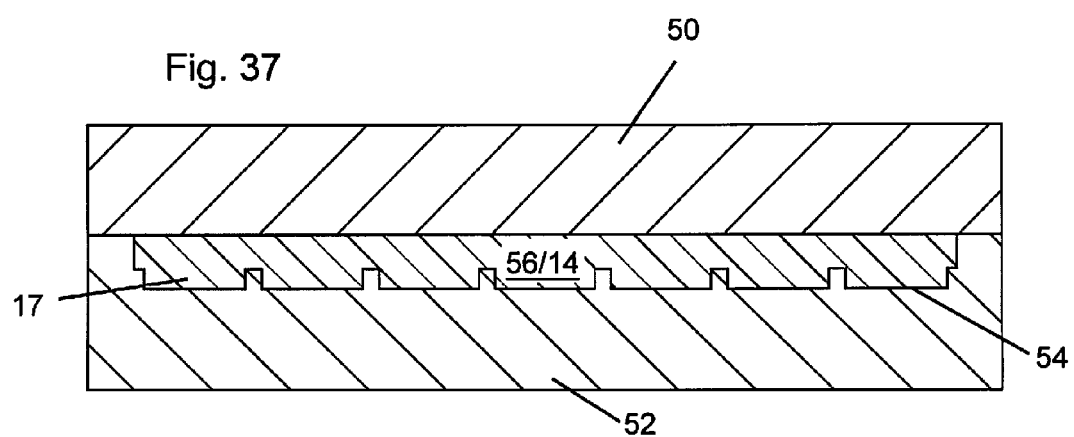
FIG. 37 is a cutaway view of the end of the mold structure enclosing expandable polystyrene beads while the mold structure is being heated.

First, heat-expandable beads 56 are placed into the mold structure within the bottom portion 52 on top of and therefore adjacent to pedestal-forming structures 54 (step 110), as shown in FIG. 35. The pedestal-forming structures 54 are part of the bottom portion 52 of the mold structure, and have a shape corresponding to the shape of the desired pedestals 17. With the heat-expandable beads 56 within the mold structure between top 50 and bottom 52 portions, the mold structure is then closed, as shown in FIG. 36. Heat is then applied to the mold structure (step 120) so as to cause the heat-expandable beads 56 to expand and fuse together. While the heat-expandable beads 56 are expanding to form the insulating foam panel 14, the pressure of the expansion causes the expanding beads 56 to enter into and conform to the pedestal-forming structures 54, as shown in the cutaway view of FIG. 37.

Figure 38:
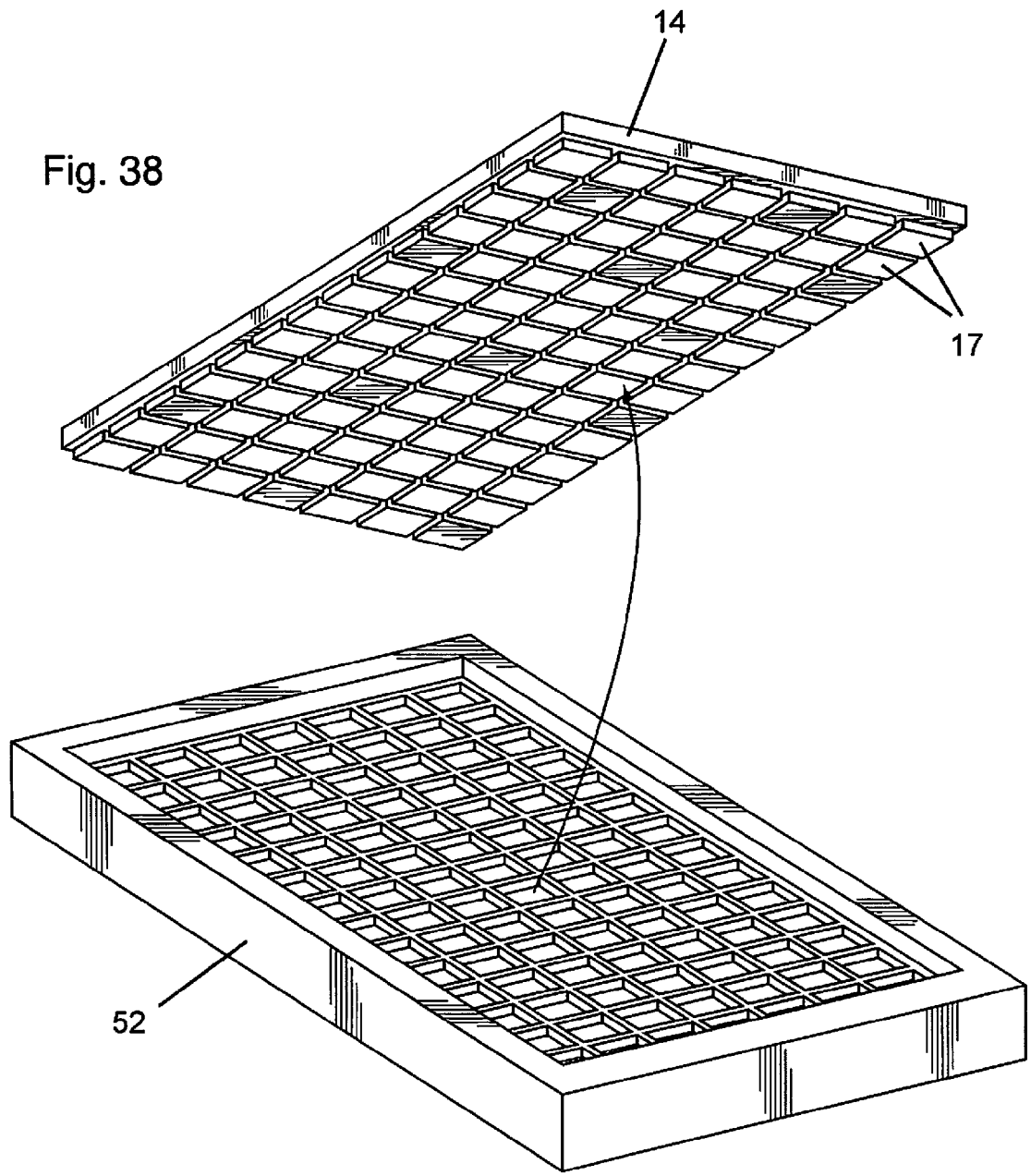
FIG. 38 is a perspective view of the insulating foam panel having been formed with pedestals within the mold.
Figure 39:
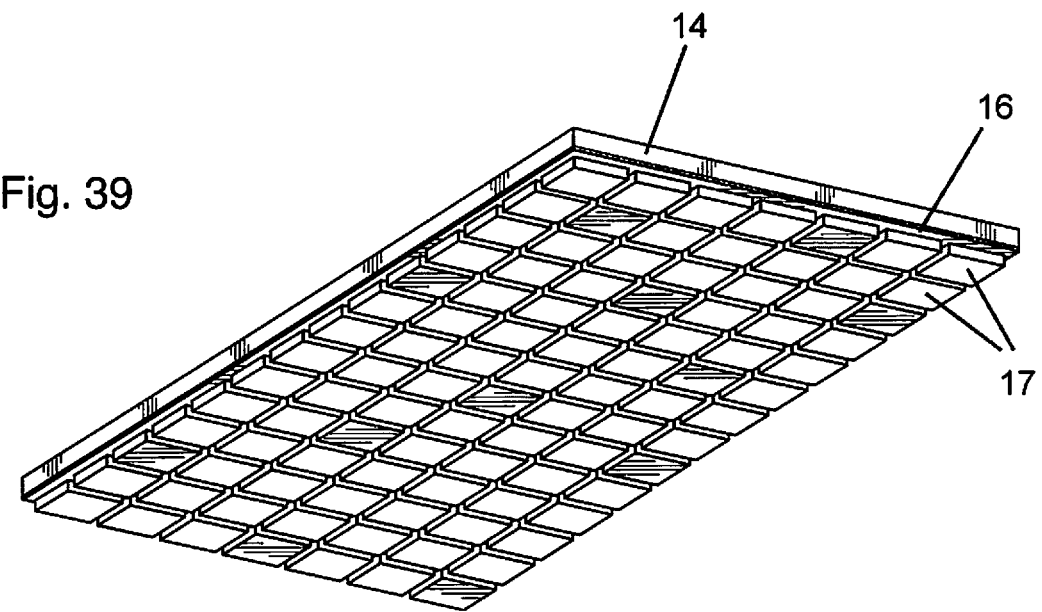
FIG. 39 is a perspective view of the insulating foam panel of FIG. 38 having been formed with a moisture-resistant layer on a face thereof.

With the insulating foam panel 14 having been formed with pedestals 17, the insulating foam panel 14 is then removed from the mold structure (step 130), as shown in FIG. 38. Heat is then applied to the first face of the insulating foam panel 14 using a suitable heat source (not shown), such as for example a radiant heater, an infrared lamp, a hot air gun, and the like. The applied heat causes the foam at and below the surface to melt or fuse, so as to form the moisture-resistant layer 16 (step 140), shown in FIG. 39.

With the moisture-resistant layer 16 having been formed on insulating foam panel 14, the hardboard layer 12 is then adhered to the insulating foam panel 14 (step 150) to thereby form the subfloor component 10.

Figure 43:
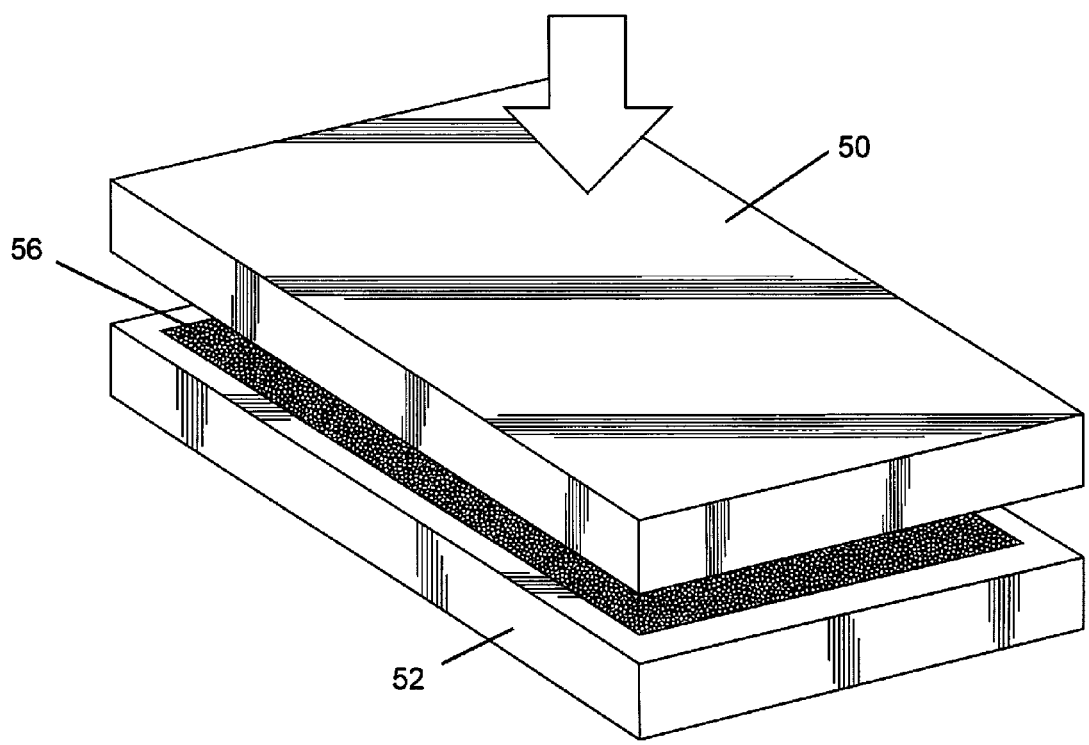
FIG. 43 is a perspective view is of a mold structure having expandable polystyrene beads poured therein being closed prior to applying heat to the mold, during manufacture of the subfloor component of FIG. 1, according to another embodiment.
Figure 44:
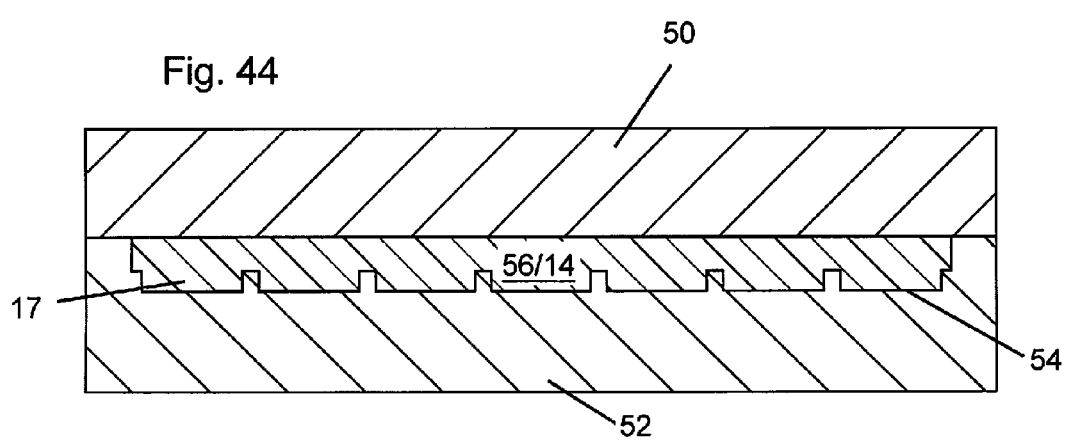
FIG. 44 is a cutaway view of the end of the mold structure enclosing expandable polystyrene beads while the mold structure is being heated.
Figure 45:
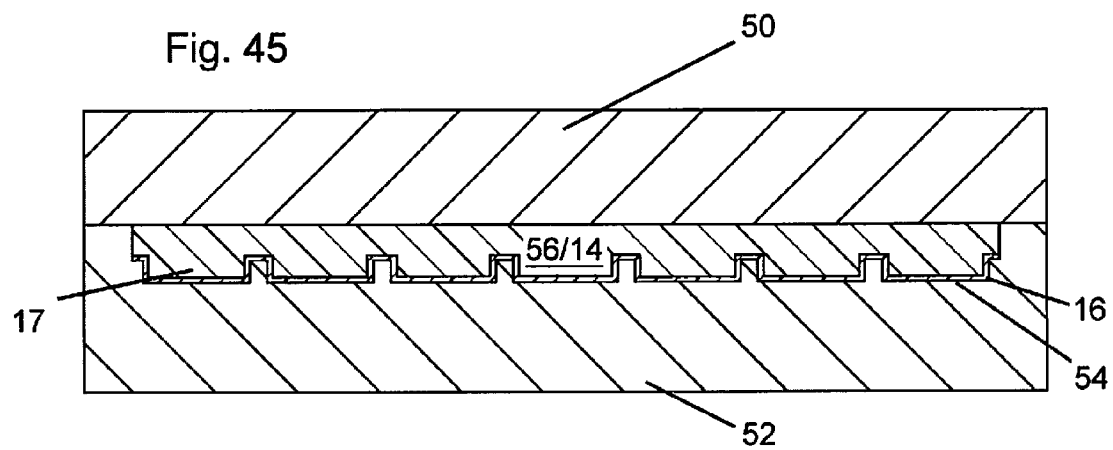
FIG. 45 is a cutaway view of the end of the mold structure enclosing an insulating foam panel while additional heat is being applied to a bottom portion of the mold structure.

Other methods may be used. For example, FIG. 47 shows a flowchart of steps of a method of manufacturing a subfloor component, such as subfloor component 10 described above. The treatment of the materials involved in some of the steps is illustrated in FIGS. 43 through 46. In FIG. 43, a mold structure is shown as having a top portion 50 and a bottom portion 52. It will be understood that the terms top and bottom may be interchanged with left and right, for example, in the case of a mold structure that stands vertically.

First, heat-expandable beads 56 are placed into the mold structure within the bottom portion 52 on top of and therefore adjacent to pedestal-forming structures 54 (step 210). With the heat-expandable beads 56 within the mold structure between top 50 and bottom 52 portions, the mold structure is then closed, as shown in FIG. 43. Heat is then applied to the mold structure (step 220) so as to cause the heat-expandable beads 56 to expand and fuse together. While the heat-expandable beads 56 are expanding to form the insulating foam panel 14, the pressure of the expansion causes the expanding beads 56 to enter into and conform to the pedestal-forming structures 54, as shown in the cutaway view of FIG. 44.

With the insulating foam panel 14 having been formed with pedestals 17, and with the insulating foam panel 14 still in the mold structure, additional heat is then applied to the bottom portion 52 of the mold structure (step 230). The additional heat causes the foam at and below the surface of the first face of the insulating foam panel 14 to melt or fuse, so as to form the moisture-resistant layer 16, as shown in the cutaway view of FIG. 45.

Figure 46:
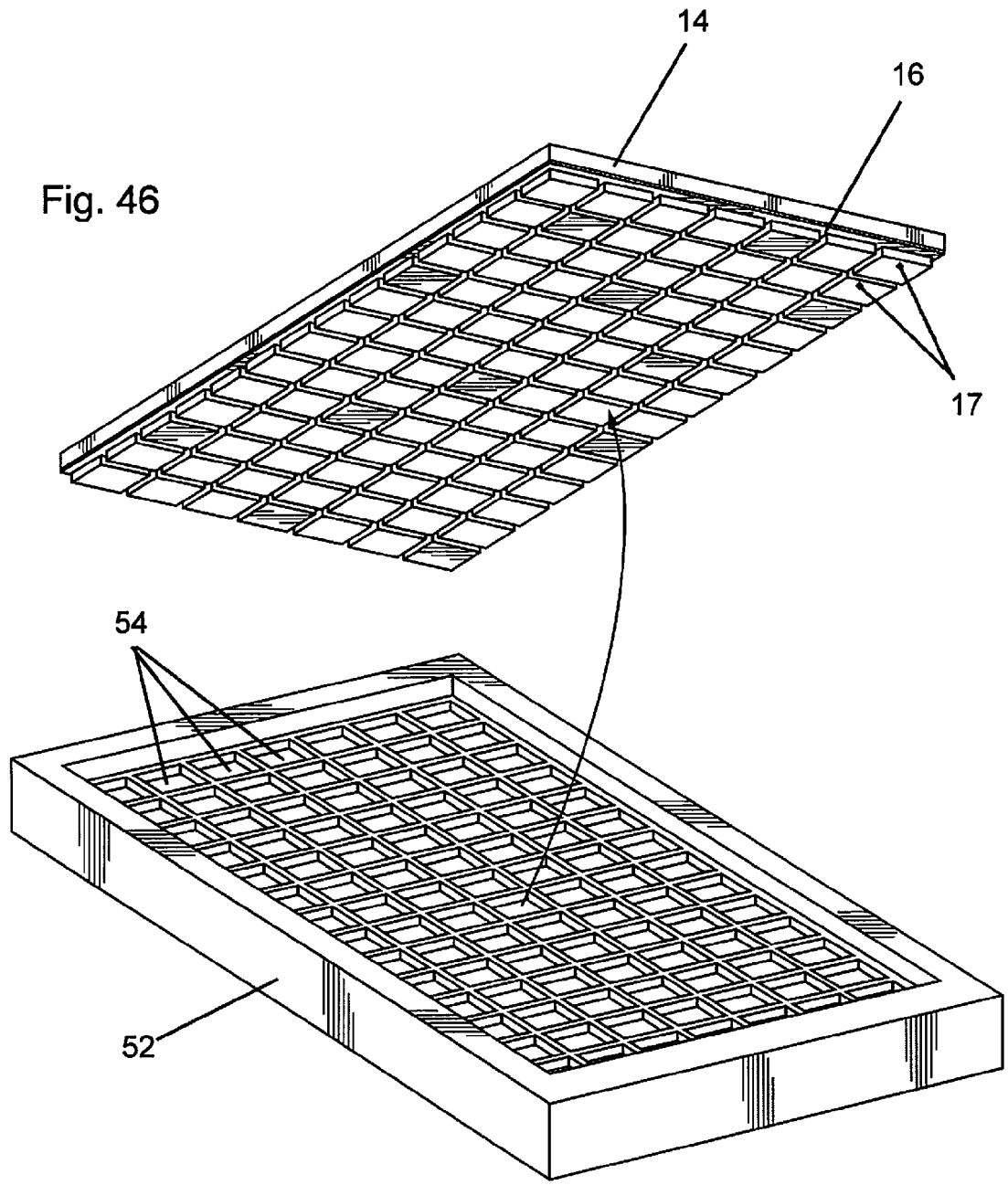
FIG. 46 is a perspective view of the insulating foam panel having been formed with a moisture-resistant layer on a face thereof within the mold.
Figure 47:
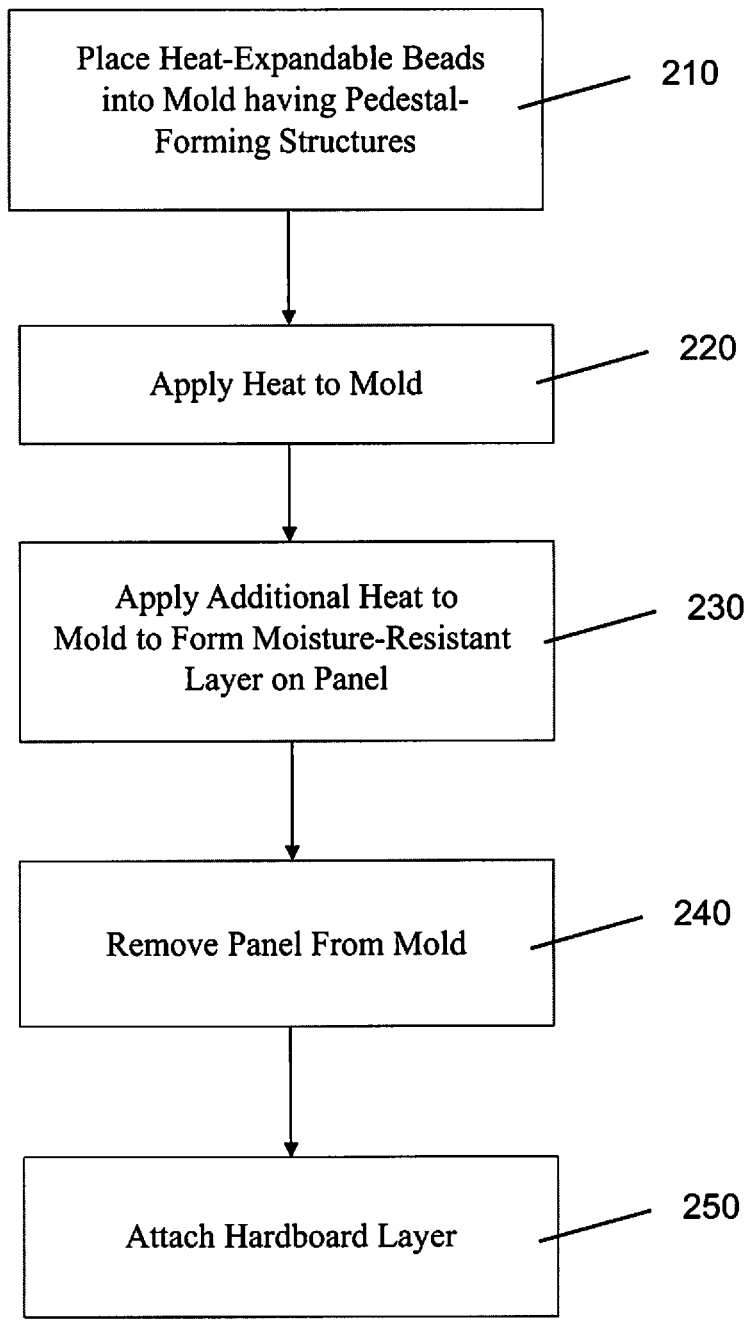
FIG. 47 is a flowchart of steps for manufacturing the subfloor component, according to the embodiment of FIGS. 43 to 46.

With the moisture-resistant layer 16 having been formed on the insulating foam panel 14, the combination is then removed from the mold structure (step 240), as shown in FIG. 46. The hardboard layer 12 is then adhered to the combination that was removed from the mold structure (step 250), to thereby form the subfloor component 10.

Figure 48:
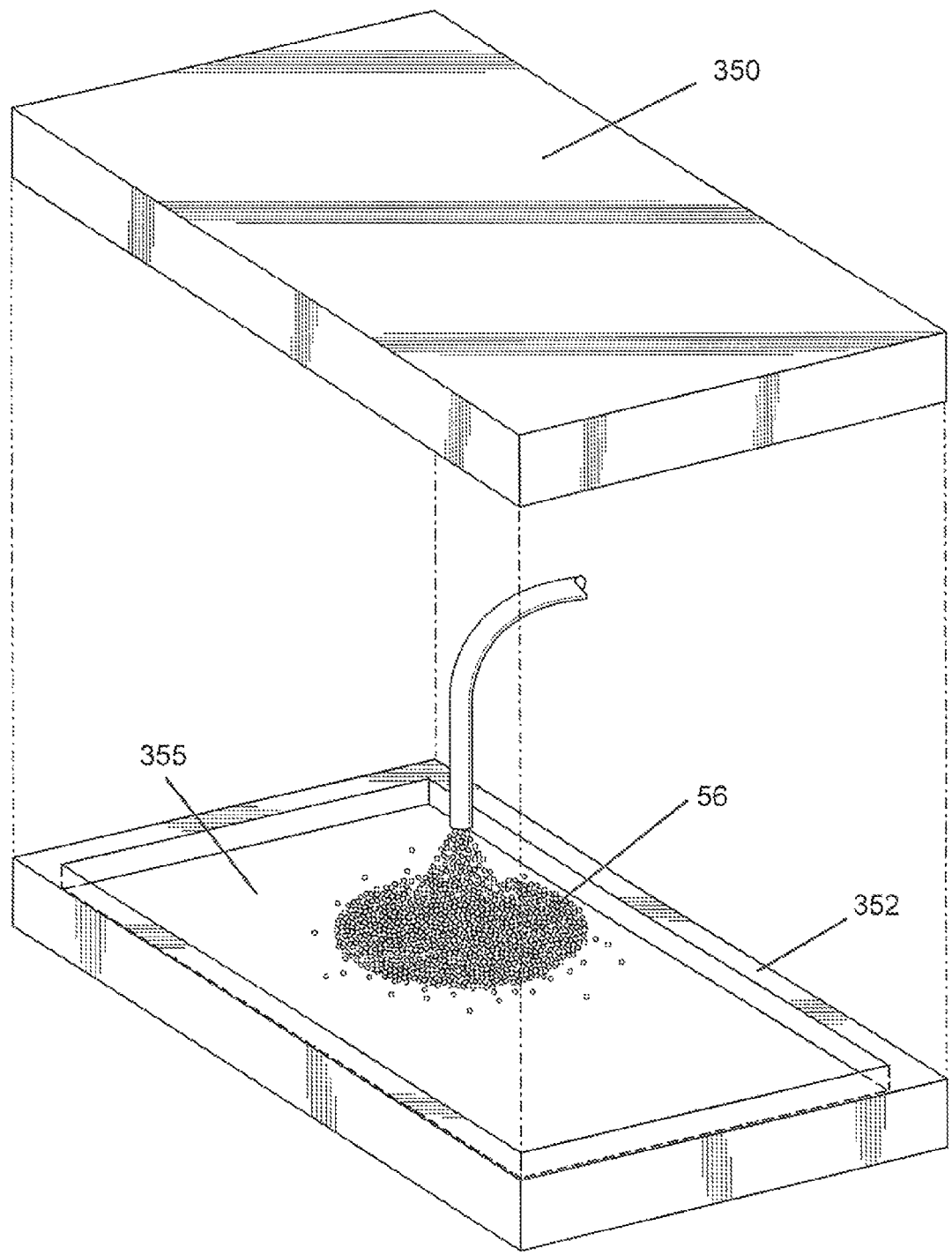
FIG. 48 is a perspective view of expandable polystyrene beads being poured into a first mold structure, during manufacture of the subfloor component of FIG. 1, according to still another embodiment.
Figure 49:
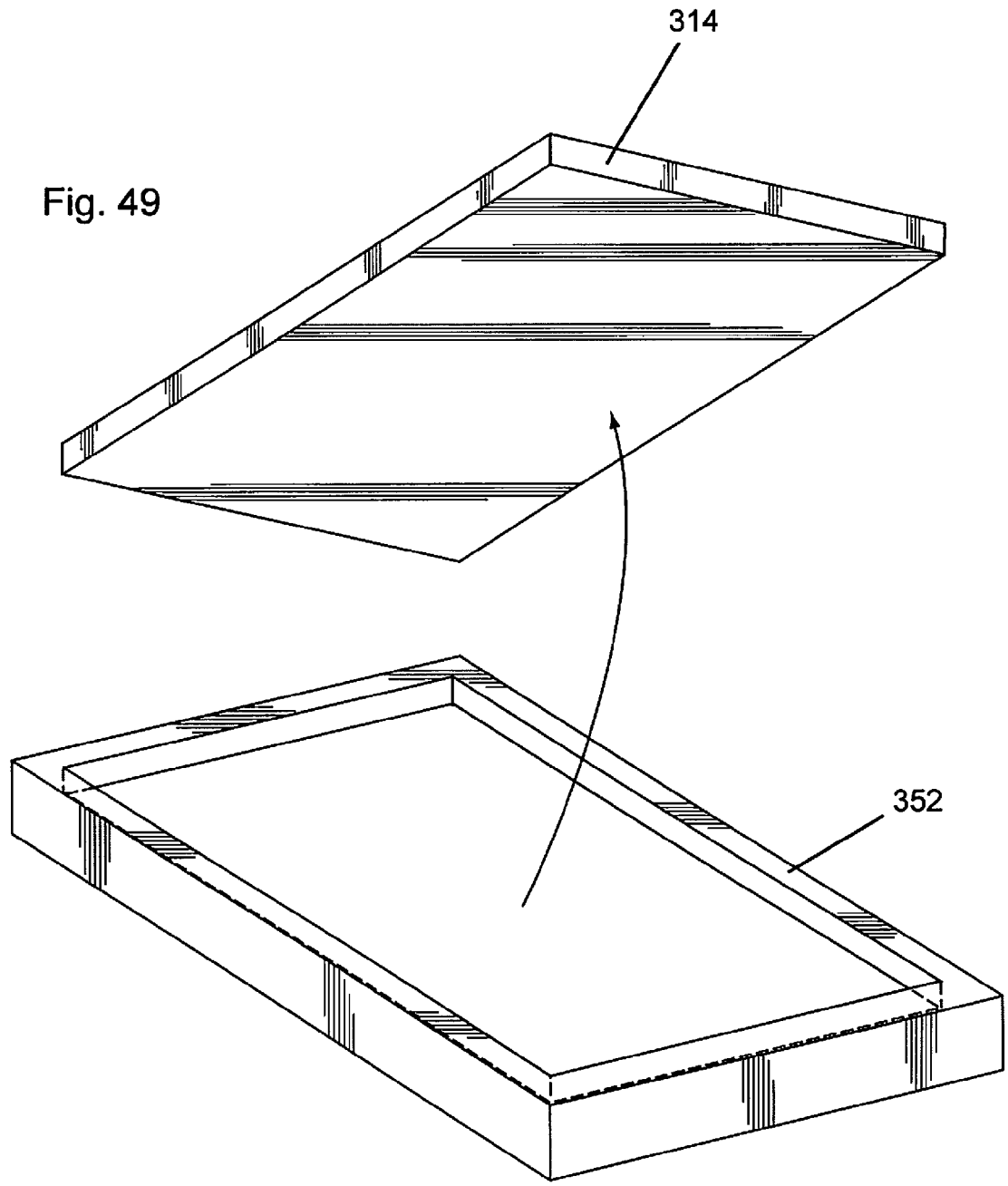
FIG. 49 is a perspective view of an insulating foam body having been formed within the mold.
Figure 50:
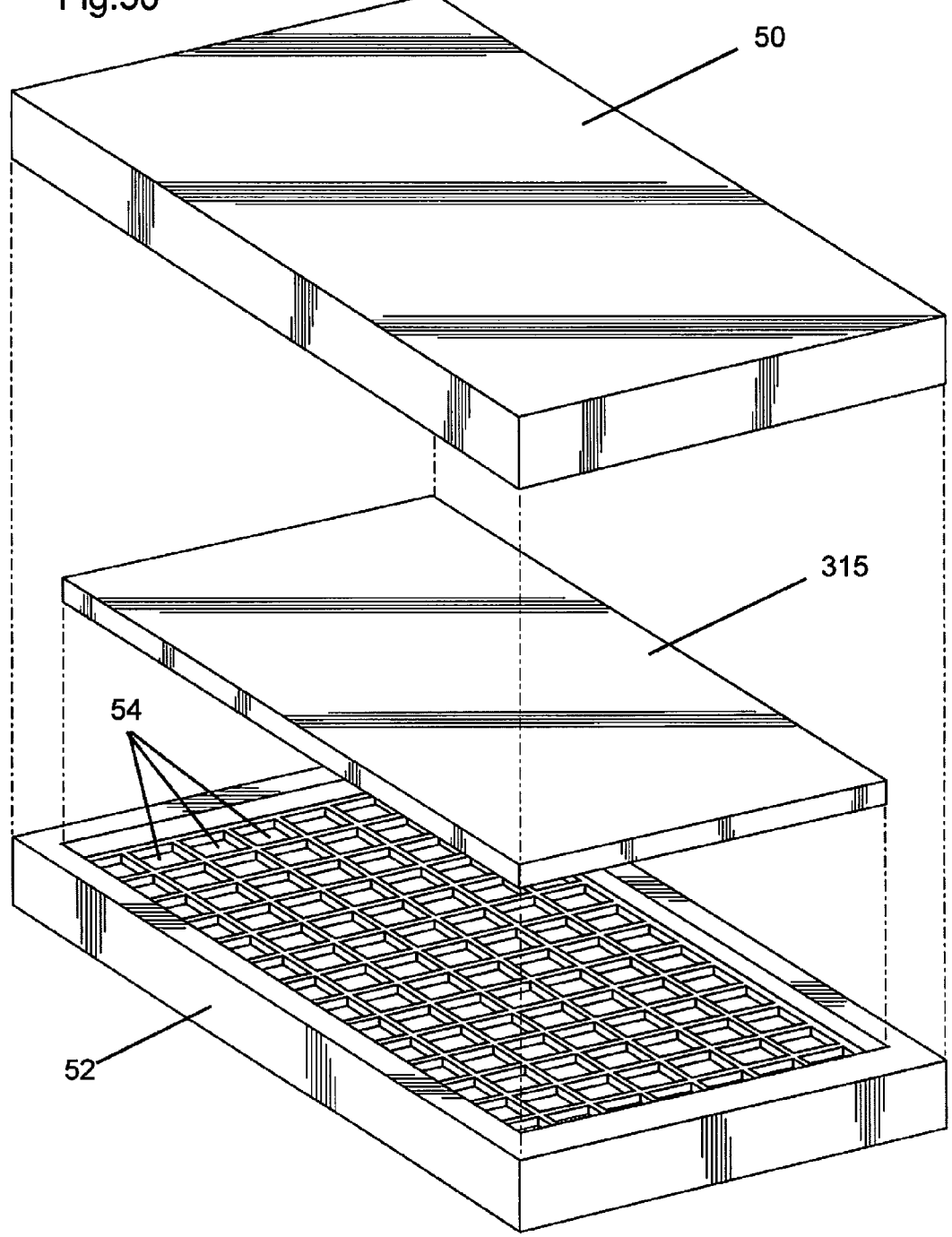
FIG. 50 is a perspective view of the insulating foam body being placed against pedestal-forming structures within a second mold structure.
Figure 51:
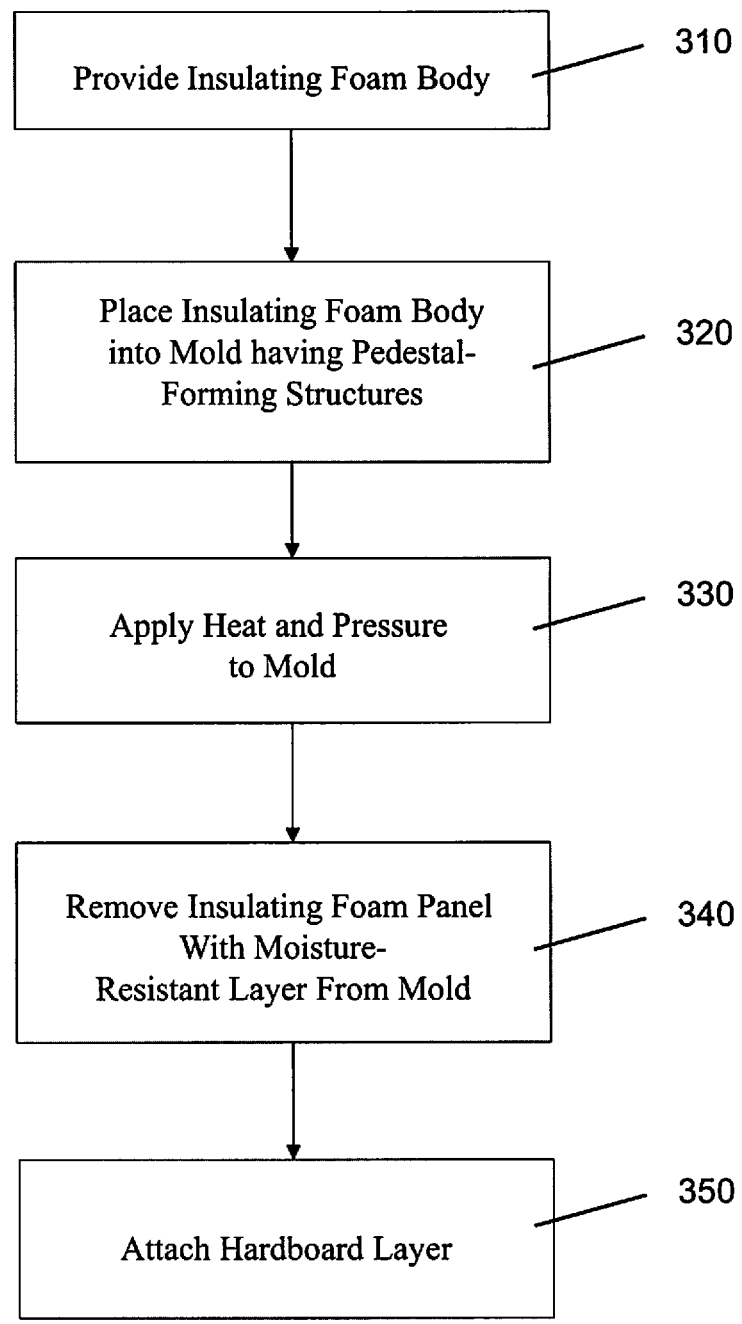
FIG. 51 is a flowchart of steps for manufacturing a subfloor component, according to the embodiment of FIGS. 48 to 50.
Figure 52:
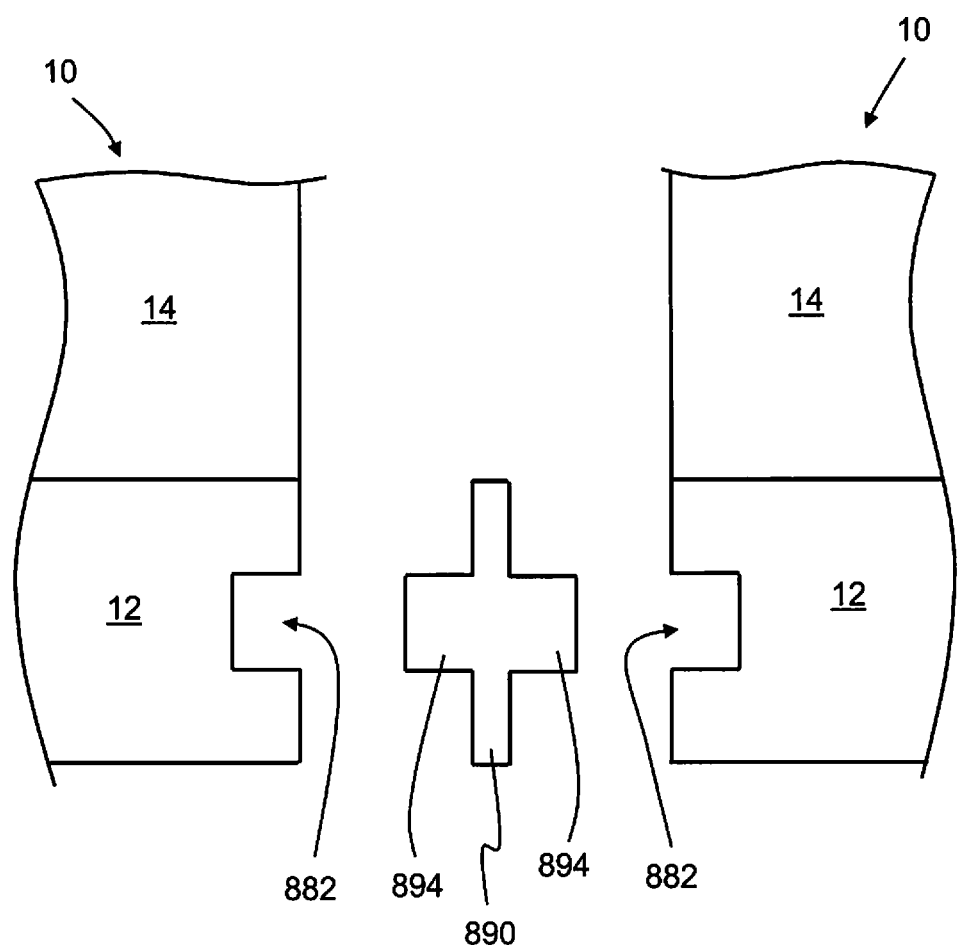
FIG. 52 is an exploded side view of a portion two subfloor components according to another embodiment, and a connector strip therebetween.

Still other methods may be used. For example, FIG. 51 shows a flowchart of steps of a method of manufacturing a subfloor component such as subfloor component 10 described above. The treatment of the materials involved in some of the steps is illustrated in FIGS. 48 through 50. In FIG. 48, a first mold structure is shown to have a top portion 350 and a bottom portion 352.

First, heat-expandable beads 56 are placed within the bottom portion 352 of the first mold structure on top of and therefore adjacent to generally planar mold surface 355, as shown in FIG. 48. With the heat-expandable beads 56 within the mold structure between top 350 and bottom 352 portions, the first mold structure is then closed, as shown in FIG. 49. Heat is then applied to the mold structure so as to cause the heat-expandable beads 56 to expand and fuse together. While the heat-expandable beads 56 are expanding to form an insulating foam body, the pressure of the expansion causes the expanding beads 56 to conform to the generally planar mold surface 355. The resulting insulating foam body has opposing faces that are generally planar.

The insulating foam body is then removed from the first mold structure, as shown in FIG. 49, to thereby provide the insulating foam body 315 (step 310). The insulating foam body 315 is then placed within the bottom portion 52 of a second mold structure on top of and therefore adjacent to pedestal-forming structures 54 (step 320), as shown in FIG. 50. With the insulating foam body 315 within the second mold structure between top 50 and bottom 52 portions, the second mold structure is then closed. Heat and pressure are then applied to the second mold structure (step 330) so as to cause the insulating foam body 315 to enter into and conform to the pedestal-forming structures 54, and thereby form the insulating foam panel 14. Additionally, heat applied to the bottom portion 52 of the second mold structure causes the foam at and below the surface of the first face of the insulating foam panel 14 to melt or fuse, so as to form the moisture-resistant layer 16.

With the insulating foam panel 14 having been formed with the moisture-resistant layer 16 thereon, the combination is then removed from the second mold structure (step 340). The hardboard layer 12 is then adhered to the combination that was removed from the second mold structure (step 350), to thereby form the subfloor component 10.

It will be understood that other approaches may alternatively be used to provide the insulating foam body referred to step 310.

Although in embodiments described above, the subfloor components have tongue and groove configurations along the edges which abut against each other, in other embodiments, other configurations may be used. For example, in other embodiments, the subfloor components may alternatively have grooves along the edges, and with each groove being configured to receive a connector for connecting adjacent subfloor components. The connector may be, for example, a longitudinal connector strip comprising opposing tongues, with each tongue being shaped to be received by a respective groove.

For example, FIG. 50 shows two adjacent subfloor components 10, each subfloor component 10 including a hardboard panel 12, an insulating foam panel 14, and a moisture-resistant film (not shown). The insulating foam panel 14 includes first and second opposing faces, with multiple intersecting grooves in the first face defining, in cross-section, multiple pedestals (not shown), as in subfloor component 10 described above and with reference to FIGS. 1 to 5. Each hardboard panel 12 has two (2) grooves 882 formed therein on opposing sides. In this embodiment, the adjacent subfloor components 10 are configured to be connected by a connector in the form of a longitudinal connector strip 890 having a length extending into the page. The connector strip 890 comprises two (2) opposing tongues 894, with each tongue 894 being shaped to be received by a respective groove 882 and having a thickness that provides frictional engagement with the inside of the groove 882 for connecting the adjacent subfloor components 10.

The connector strip 890 may be made of plastic, metal, or one or more other suitable materials, and may be a unitary device or be made of two or more interconnected pieces.

The length of the connector strip 890 may be less than, the same as, or greater than the corresponding length of a particular subfloor component 10. As will be understood, the connector strip 890 functions to align the hardboard layers 12 and to thereby keep the adjacent subfloor components 10 into which it is inserted from shifting relative to each other thereby providing a more unitary subfloor, and generally on the same plane as each other. In the embodiment shown in FIG. 50, each side of the hardboard layer 12 is recessed slightly from the side of the corresponding foam panel 14 so as to accommodate the central body of the connector strip 890 in a way that permits the facing sides of the foam panels 14 to generally contact each other, despite the insertion of the connector strip 890 between the hardboard layers 12. That is, each hardboard layer 12 is recessed an amount corresponding to half the thickness of the central body of the connector strip 890.

In an alternative configuration, one of the hardboard layers 12 may be recessed an amount corresponding to the entire thickness of the central body of the connector strip 890, rather than just half of the thickness, while the hardboard layer 12 that faces the recessed layer is not recessed at all with respect to its corresponding foam panel 14. In this way, the central body of the connector strip 890 is accommodated entirely by the recession of one of the hardboard layers 12. Other configurations for accommodating the central body of the connector strip 890 are possible.

In another alternative configuration, one or both of the opposing tongues 894 of the connector strip may alternatively have barbs extending therefrom for frictionally engaging, or "gripping", the insides of the groove(s) 882 to help with resisting of sliding of the connector strip relative to the subfloor components. As will be understood, such a barbed configuration would make it easy for an installer to insert a connector strip into grooves.

In another alternative configuration, a connector may be provided that has no central body but that simply consists of tongues 894. With such a configuration, there may be a less rigid connection between hardboard layers 12. Advantageously, however, there would be no requirement for recession of one or both hardboard layers 12 to accommodate a central body in this case, and the hardboard layers 12 could therefore be arranged to contact each other in a manner such as is described above for adjacent facing sides of the foam panels 14.

Although in the embodiment shown in FIG. 50, there are grooves formed along two (2) opposing sides of the hardboard panel, in other embodiments, there may alternatively be grooves formed along the four (4) sides of the hardboard panel. The grooves may be formed prior to, or after, attaching the hardboard panel to the insulating foam panel.

Furthermore, while in the embodiments disclosed above the pedestals are generally uniformly distributed across the insulating foam panel, alternatives may be provided having pedestals that are not so uniformly distributed.

Although in the embodiments described above, the moisture resistant layer is formed by heating the first face of the insulating foam panel so as to cause the foam at and below the surface to melt or fuse, in other embodiments, the moisture resistant layer may alternatively formed by chemically treating the first face of the insulating foam panel. For example, in one such embodiment, a solvent may be applied to the first face to cause the foam at and below the surface to partially dissolve or fuse, and thereby form the moisture resistant layer. The solvent may be an organic solvent, such as acetone, for example.

Although in the embodiments described above, the moisture-resistant layer is formed on the tops and walls of the pedestals as well as on the bottom of the grooves, in other embodiments, the moisture resistant layer may alternatively be formed on only a portion of the pedestals, such as for example on only the tops of the pedestals, or on only the tops and a portion of the sides.

Although embodiments have been described above with reference to the accompanying drawings, those of skill in the art will appreciate that variations and modifications may be made without departing from the scope thereof as defined by the appended claims.

What is claimed is:

1. A subfloor component comprising:
    an insulating foam panel having first and second opposing faces and a plurality of intersecting grooves in the first face to define, in cross-section, a plurality of pedestals having at least one wall extending toward the second face;
    a moisture-resistant layer formed on the first face of the panel that conforms to the pedestals; and
    a hardboard layer on the second face of the panel.

2. The subfloor component of claim 1, wherein the moisture-resistant layer comprises a layer of melted or fused insulating foam.

3. The subfloor component of claim 2, wherein the layer of fused insulating foam extends partially into the insulating foam panel from the first face.

4. The subfloor component of claim 1, wherein the moisture-resistant layer is substantially moisture-impervious.

5. The subfloor component of claim 1, wherein the moisture-resistant layer conforms to the tops and walls of the pedestals and to the bottoms of the grooves.

6. The subfloor component of claim 1, wherein the moisture-resistant layer is formed by heating or chemically treating the first face of the insulating foam panel.

7. The subfloor component of claim 1, wherein the panel comprises expanded polystyrene (EPS).

8. The subfloor component of claim 1, wherein the hardboard layer comprises material selected from the group consisting of: oriented strand board (OSB), plywood, fiber cement board, cement board, metal sheeting, and magnesium oxide board.

9. The subfloor component of claim 1, wherein the hardboard layer and the panel are attached to each other with glue.

10. The subfloor component of claim 1, wherein the pedestals are shaped as at least one of circles, ellipses, rectangles, diamonds, squares, and hexagons.

11. The subfloor component of claim 10, wherein each of the plurality of pedestals has a single wall.

12. The subfloor component of claim 1, wherein the pedestals are generally uniformly distributed across the first face of the panel.

13. The subfloor component of claim 1, wherein the subfloor component is shaped to connect to another subfloor component.

14. The subfloor component of claim 13, wherein the hardboard layer comprises a tongue/groove configuration for connecting to another hardboard layer of another subfloor component.

15. The subfloor component of claim 1, wherein the hardboard layer includes a groove that is open along at least one side-facing surface of the hardboard layer, further comprising:
a connector dimensioned to insert into the groove.

16. The subfloor component of claim 15, wherein the connector comprises:
a central body; and
tongues extending outwards from the central body, wherein each tongue is dimensioned to be inserted into a respective groove in a hardboard layer of a subfloor component.

* * * * *